(12) United States Patent
Yamakawa et al.

(10) Patent No.: US 8,402,749 B2
(45) Date of Patent: Mar. 26, 2013

(54) CONTROL METHOD OF SPARK-IGNITION ENGINE AND SPARK-IGNITION ENGINE SYSTEM

(75) Inventors: Masahisa Yamakawa, Hiroshima (JP); Takashi Youso, Hiroshima (JP); Kouhei Iwai, Hiroshima (JP); Shuji Oba, Hiroshima (JP)

(73) Assignee: Mazda Motor Corporation (JP)

( * ) Notice: Subject to any disclaimer, the term of this patent is extended or adjusted under 35 U.S.C. 154(b) by 241 days.

(21) Appl. No.: 12/828,032

(22) Filed: Jun. 30, 2010

(65) Prior Publication Data

US 2011/0011061 A1 Jan. 20, 2011

(30) Foreign Application Priority Data

Jul. 16, 2009 (JP) ................................. 2009-167483

(51) Int. Cl.
*F01N 3/00* (2006.01)
(52) U.S. Cl. ................ 60/285; 60/284; 60/274
(58) Field of Classification Search .................... 60/284, 60/285, 274, 299
See application file for complete search history.

(56) References Cited

U.S. PATENT DOCUMENTS

| | | | |
|---|---|---|---|
| 6,240,724 B1 * | 6/2001 | Kudou et al. ................... | 60/284 |
| 6,318,074 B1 * | 11/2001 | Nishimura et al. ............. | 60/284 |
| 6,330,796 B1 * | 12/2001 | Nishimura et al. ............. | 60/286 |
| 6,345,499 B1 * | 2/2002 | Nishimura et al. ............. | 60/277 |
| 6,684,630 B2 * | 2/2004 | Uchida et al. .................. | 60/284 |
| 6,932,053 B2 * | 8/2005 | Ichihara et al. ................ | 123/344 |
| 6,953,769 B2 * | 10/2005 | Yamada et al. ................ | 502/302 |
| 6,976,355 B2 * | 12/2005 | Imada et al. ................... | 60/285 |
| 7,073,480 B2 * | 7/2006 | Shiraishi et al. ............... | 123/295 |
| 2006/0266020 A1 * | 11/2006 | Okamoto et al. ............... | 60/284 |

FOREIGN PATENT DOCUMENTS

| | | |
|---|---|---|
| JP | H08-224446 A | 9/1996 |
| JP | 2003-120269 A | 4/2003 |
| JP | 2006-057493 A | 3/2006 |

* cited by examiner

*Primary Examiner* — Thomas E. Denion
*Assistant Examiner* — Anthony Ayala Delgado
(74) *Attorney, Agent, or Firm* — Studebaker & Brackett PC; Donald R. Studebaker

(57) ABSTRACT

In a specified operating area including a low engine-speed and low engine-load area, an excess air ratio λ is set at a specified ratio which is two or greater and three or smaller and an ignition timing θig of a spark plug is set at a timing of MBT to provide the maximum torque as a normal combustion control (S4). In case a catalyst temperature Tc is lower than a predetermined first temperature T1 in this area, a control of retarding the ignition timing from the MBT timing and/or a control of decreasing the excess air ratio λ to a ration below the above-described ratio are executed (S6, S8, S9). Accordingly, the temperature of the catalyst can be prevented simply and effectively from decreasing excessively, maintaining combustion conditions to provide a properly high thermal efficiency.

17 Claims, 20 Drawing Sheets

FIG. 14
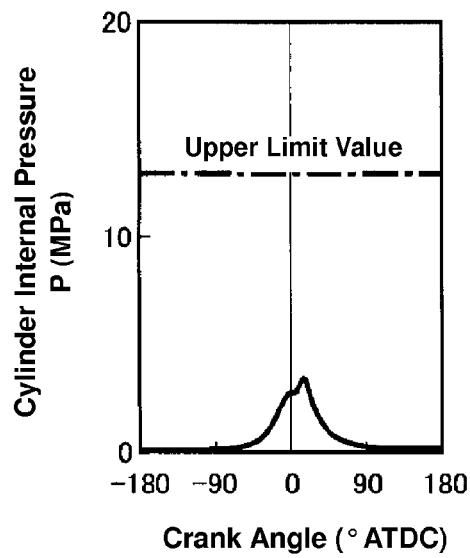
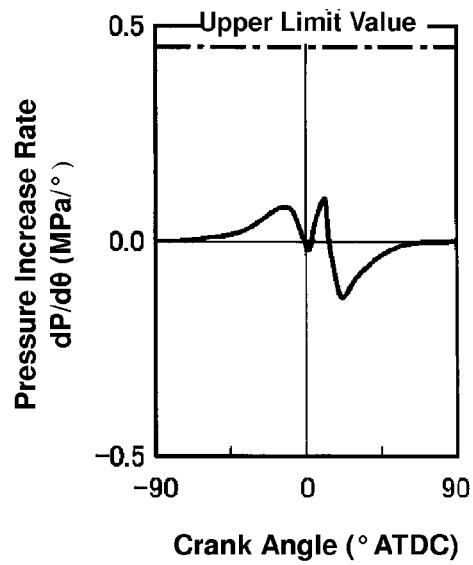
$\varepsilon = 18, \lambda = 3, \theta\,ig = MBT, \Delta\theta = 20°$
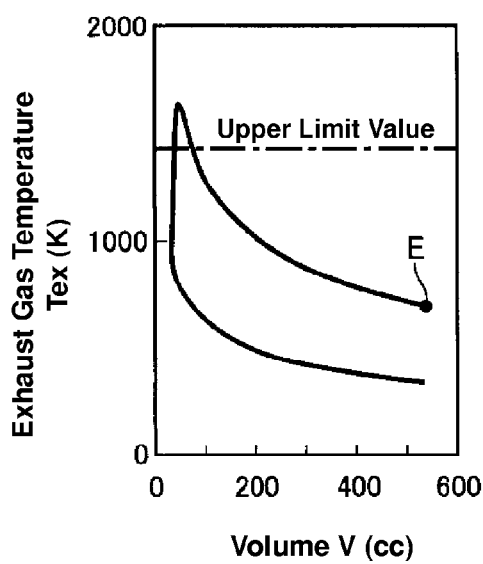
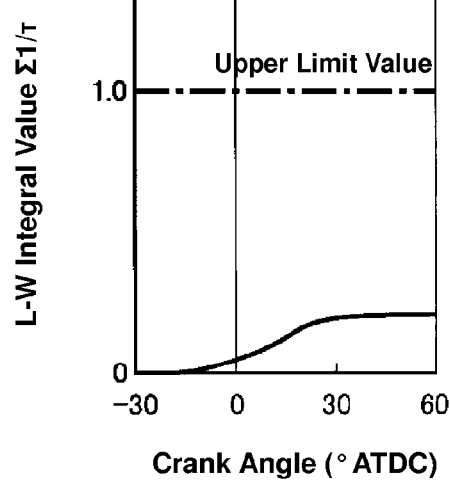

| | Σ1/τ (Knocking) | Pmax | dP/dθmax | Tex | Thermal Efficiency (Order) | |
|---|---|---|---|---|---|---|
| ε Decrease | ○ | ○ | ○ | ○ | 3 | ←☆ |
| λ Increase (lean) | × | × | ○ | ○ | 1 | |
| Δθ Shortening | ○ | ○ | × | ○ | 2 | |
| Θig Retard | ○ | ○ | ○ | ○ | 4 | |

| | $\Sigma 1/\tau$ (Knocking) | Pmax | dP/d$\theta$max | Tex | Thermal Efficiency (Order) |
|---|---|---|---|---|---|
| ε Decrease | ○ | ○ | ○ | ○ | 4 |
| λ Increase (lean) | ○ | × | ○ | ○ | 1 |
| Δθ Extension | × | ○ | ○ | ○ | 2 |
| Θig Retard | ○ | ○ | ○ | ○ | 3 ←☆ |

CONTROL METHOD OF SPARK-IGNITION ENGINE AND SPARK-IGNITION ENGINE SYSTEM

BACKGROUND OF THE INVENTION

The present invention relates to a control method of a spark-ignition engine and a spark-ignition engine system, which comprise a spark plug to supply a spark to ignite an air-fuel mixture within a combustion chamber and a catalyst for purifying exhaust gas which is provided in an exhaust passage.

Conventionally, a catalyst-temperature control device, which comprises a catalyst provided in an exhaust passage of an internal combustion engine where combustion is performed under a lean air-fuel ratio, an exhaust control valve to control the amount of exhaust gas flowing into the catalyst, and another combustion device which is provided in addition to the internal combustion engine, is known as disclosed in Japanese Patent Laid-Open Publication No. 2003-120269. In this control device, when increasing the catalyst temperature is required, the opening of the exhaust control valve is controlled so that the amount of exhaust gas flowing into the catalyst from the engine can decrease, and the combustion device operates in such a manner that combustion therein is performed under a rich air-fuel ratio so that high-temperature exhaust gas exhausted from this device can be supplied into the catalyst.

The catalyst-temperature control device disclosed in the above-described publication can improve the thermal efficiency of the engine by the combustion under the lean air-fuel ratio. Further, since the high-temperature exhaust gas exhausted from the combustion device is supplied into the catalyst, a stable increase of the catalyst temperature can be provided even if the temperature of the exhaust gas from the engine is relatively low because of the combustion under the lean air-fuel ratio in the engine.

The device disclosed in the above-described publication, however, has a problem in that since the above-described combustion device is required additionally to the engine, the device may become complex as a whole and the number of parts or manufacturing costs may improperly increase.

SUMMARY OF THE INVENTION

The present invention has been devised in view of the above-described matters, and an object of the present invention is to provide a control method of a spark-ignition engine and a spark-ignition engine system which can simply and effectively prevent the temperature of the catalyst from decreasing excessively, maintaining combustion conditions to provide a properly high thermal efficiency.

According to the present invention, there is provided a control method of a spark-ignition engine which comprises a spark plug to supply a spark to ignite an air-fuel mixture within a combustion chamber and a catalyst for purifying exhaust gas which is provided in an exhaust passage, the control method comprising executing a normal combustion control in case an engine operating condition is in a specified operating area including a low engine-speed and low engine-load area and a temperature of the catalyst is a specified temperature or higher, the normal combustion control including setting an excess air ratio $\lambda$ at a first specified ratio which is between two and three and setting an ignition timing at a timing of MBT to provide the maximum torque, and executing a catalyst-temperature-related combustion control in case the engine operating condition is in the specified operating area and the temperature of the catalyst is lower than the specified temperature, the catalyst-temperature-related combustion control having at least a first control which is executed when the catalyst temperature is within a first temperature range and a second control which is executed when the catalyst temperature is lower than the first temperature range, the first control including setting the excess air ratio $\lambda$ at two or greater and retarding the ignition timing from the timing of MBT, the second control including setting the excess air ratio $\lambda$ to one or smaller and maintaining the ignition timing at the timing of MBT.

Herein, the above-described timing of MBT to provide the maximum torque means a so-called ignition timing of minimum advance for best torque. Further, the above-described excess air ratio $\lambda$ (Lambda) is a technical term to mean an alternative way to represent the air-fuel ratio of the mixture, and this Lambda $\lambda$ is the ratio of actual air-fuel ratio to stoichiometry for a given mixture. Accordingly, Lambda $\lambda$ of 1.0 is at stoichiometry, rich mixtures are smaller than 1.0, and lean mixtures are greater than 1.0.

According to the present invention, since the ignition timing is retarded or the excess air ratio $\lambda$ is decreased (making the air-fuel mixture rich) at need in the above-described specified operating area where the exhaust-gas temperature is so low that the catalyst temperature may be lower than the catalyst's active temperature, the exhaust-gas temperature can be increased easily, so that the catalyst temperature can be effectively prevented from decreasing excessively. Further, since the control kind of the catalyst-temperature-related combustion control having at least two-kind controls is selected depending on the catalyst temperature, the degree (amount) of the above-described increase of the exhaust-gas temperature can be adjusted properly according to an increase requirement of the catalyst temperature. Consequently, the activation of the catalyst can be properly ensured.

According to an embodiment of the present invention, the above-described control method of the spark-ignition engine further comprises, when the catalyst temperature decreases beyond the specified temperature in the specified operating area, decreasing the excess air ratio $\lambda$ from the first specified ratio to a second specified ratio which is two or greater and smaller than the first specified ratio while maintaining the ignition timing at the timing of MBT According to another embodiment of the present invention, a combustion period of the air-fuel mixture is maintained within a range of 20±5° in crank angle in the specified operating area regardless of the ignition timing which is set at the timing of MBT or retarded from the timing of MBT. Thereby, the appropriate combustion period for the thermal efficiency is ensured regardless of the ignition timing. Accordingly, the decrease of the thermal efficiency in case the ignition timing is retarded can be minimized.

According to another aspect of the present invention, there is provided a spark-ignition engine system which comprises a spark plug to supply a spark to ignite an air-fuel mixture within a combustion chamber and a catalyst for purifying exhaust gas which is provided in an exhaust passage, the engine system comprising an air-fuel control device to control an air-fuel ratio of the air-fuel mixture, an ignition control device to control an ignition timing by the spark plug, an engine-operating condition detecting device to detect an engine operating condition, and a catalyst-temperature detecting device to detect a temperature of the catalyst, wherein the air-fuel control device and ignition control device control the air-fuel ratio and the ignition timing so that a normal combustion control is executed in case the engine operating condition detected by the engine-operating condition detecting device is in a specified operating area including a low engine-speed and low engine-load area and the temperature of the catalyst detected by the catalyst-temperature detecting device is a specified temperature or higher, the normal combustion control including setting an excess air ratio λ at a first specified ratio which is between two and three and setting the ignition timing at a timing of MBT to provide the maximum torque, and the air-fuel control device and the ignition control device control the air-fuel ratio and the ignition timing so that a catalyst-temperature-related combustion control is executed in case the engine operating condition is in the specified operating area and the temperature of the catalyst is lower than the specified temperature, the catalyst-temperature-related combustion control having at least a first control which is executed when the catalyst temperature is within a first temperature range and a second control which is executed when the catalyst temperature is lower than the first temperature range, the first control including setting the excess air ratio λ at two or greater and retarding the ignition timing from the timing of MBT, the second control including setting the excess air ratio λ to one or smaller and maintaining the ignition timing at the timing of MBT.

This spark-ignition engine system can provide substantially the same operations and effects as those of the above-described control method.

Further, according to an embodiment of this engine system, the above-described catalyst-temperature-related combustion control further includes, when the catalyst temperature decreases beyond the specified temperature in the above-described specified operating area, a control of decreasing the excess air ratio λ from the above-described first specified ratio to a second specified ratio which is two or greater and smaller than the first specified ratio while maintaining the ignition timing at the timing of MBT. This embodiment can provide substantially the same operations and effects as those of the above-described embodiment of the control method.

According to another embodiment of the spark-ignition engine system, at least part of an exhaust passage from the catalyst to an engine body has a double-pipe structure. Thereby, the temperature decrease of the exhaust gas flowing down into the catalyst in the exhaust passage can be restrained effectively. Accordingly, it may be unnecessary that any frequent control to retard the ignition timing or decrease the excess air ratio λ in order to increase the exhaust-gas temperature is executed, so that the thermal efficiency can be maintained at a properly high level.

Other features, aspects, and advantages of the present invention will become apparent from the following description which refers to the accompanying drawings.

BRIEF DESCRIPTION OF THE DRAWINGS

FIG. 14 is diagrams showing values of a cylinder internal pressure, a pressure increase rate, an exhaust gas temperature, and a L-W integral value at the representative point in relation to a crank angle.

DETAILED DESCRIPTION OF THE INVENTION

Hereinafter, a preferred embodiment of the present invention will be described referring to the accompanying drawings.

Embodiment (1) Basic Structure of Engine System

Figure 1:
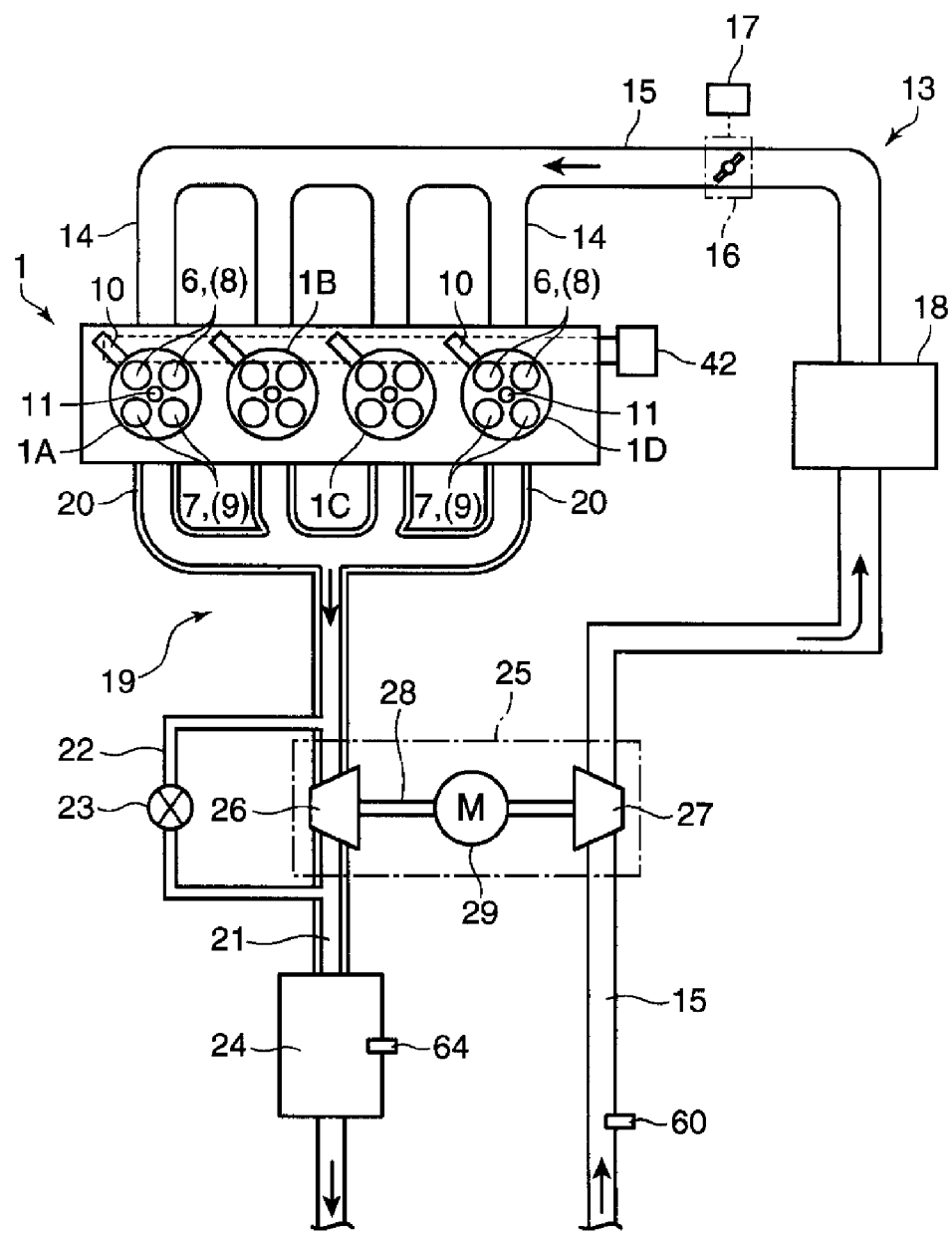
FIG. 1 is a diagram showing an entire structure of a spark-ignition engine system according to an embodiment of the present invention.
Figure 2:
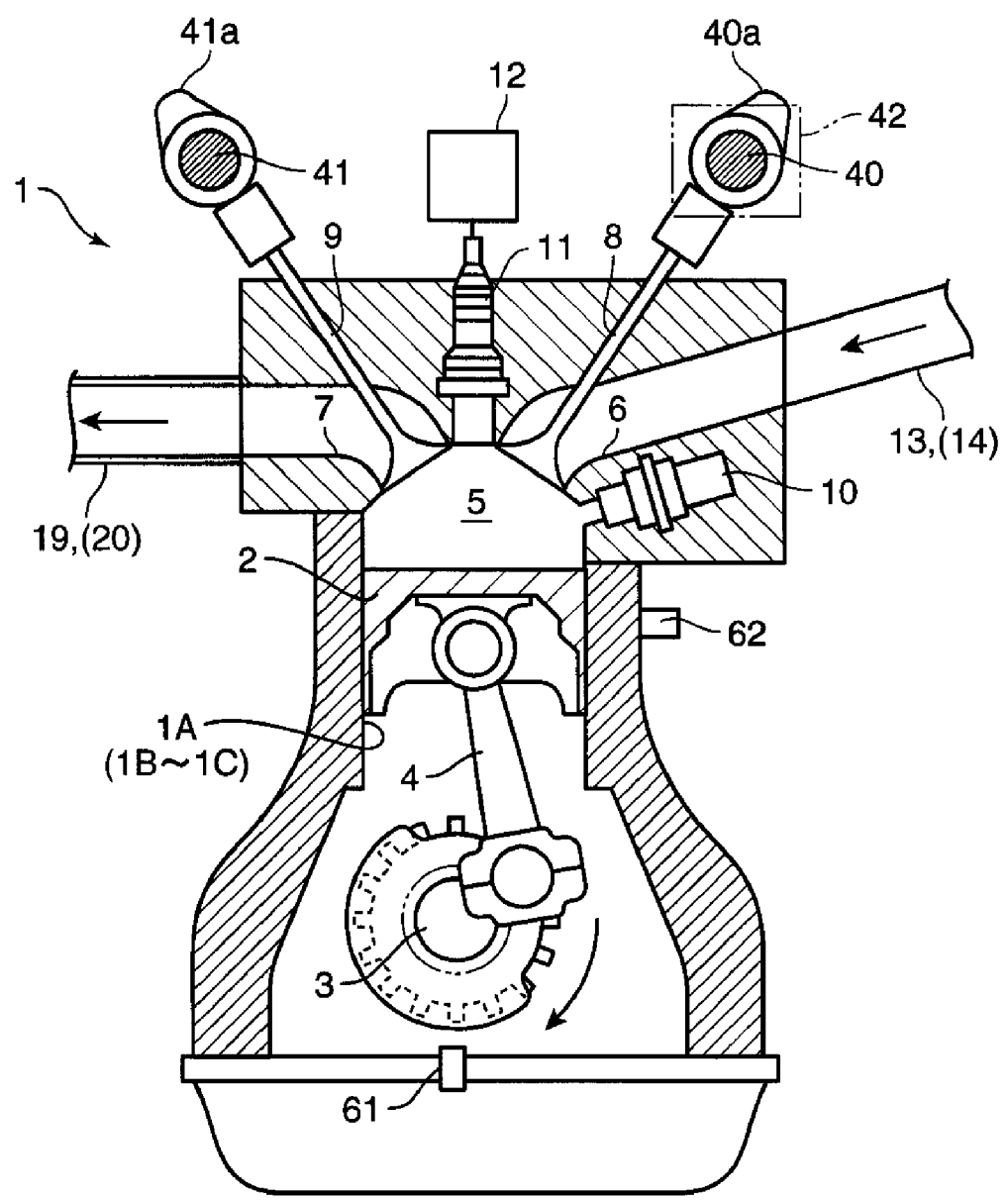
FIG. 2 is a sectional view of an engine body.

FIG. 1 is a diagram showing an entire structure of a spark-ignition engine system according to an embodiment of the present invention, and FIG. 2 is a sectional view of an engine body 1. The engine shown in these figures is an inline multi-cylinder engine, and the engine body 1 has plural cylinders (four cylinders 1A-1D in this embodiment) and a piston 2 (see FIG. 2) is inserted into each of these cylinders 1A-1D. The pistons 2 are connected to a crank shaft 3 via connecting rods 4 so that the crank shaft 3 rotates around its axis according to a reciprocating movement of the pistons 2.

A combustion chamber 5 is formed above the piston 2. An intake port 6 and an exhaust port 7 open at the combustion chamber 5. An intake valve 8 and an exhaust valve 9 which open or close the respective ports 6, 7 are provided at an upper portion of the engine body 1. This engine is a so-called double overhead camshaft (DOHC) type of engine, each cylinder of which has two intake valves 8 and two exhaust valves 9. A pair of camshafts 40, 41 (FIG. 2) which rotates according to the rotation of the crankshaft 3 is provided above these valves 8, 9. The intake and exhaust valves 8, 9 are driven (opened or closed) by plural cams 40a, 41a which are formed at the camshafts 40, 41, respectively.

A VVT 42 as a variable valve timing mechanism to change a closing timing of the intake valve 8 is provided at the engine body 1. The VVT 42, which may be a phase variable type, changes a rotational phase of the camshaft 40 relative to the crankshaft 3 according to the engine operating condition. While the structure of the VVT 42 is well known and therefore its specific description is omitted here, some phase changing member is installed between a cam pulley driven by the crankshaft via a timing belt and the camshaft, and this phase changing member is driven by an oil pressure or an electric power.

Herein, the variable valve timing mechanism may be configured to change the closing timing of the intake valve 8 by changing a valve lift amount of that. Further, this valve-lift-amount changing mechanism and the above-described valve-rotational-phase changing mechanism may be combined so that the changing control of the effective compression ratio and the control of an overlap period of the intake and exhaust valves 8, 9 can be executed concurrently.

The compression ratio of the engine of the present embodiment is set to be considerably higher than that of the normal gasoline engine. Specifically, while the geometrical compression ratio of the normal gasoline engine is about 9 through 11, the one of the engine of the present embodiment is about 18. Herein, the substantial compression ratio (the effective compression ratio) which is determined based on the closing timing of the intake valve 8 is set to be variable within the range of 18 or smaller, which will be described below.

As shown in FIGS. 1 and 2, at the engine body 1 are provided an injector 10 to inject fuel directly into the combustion chamber 5 and a spark plug 11 to supply a spark into the combustion chamber 5, which are arranged for each cylinder. In the described embodiment, the injector 10 is arranged so as to open at the combustion chamber 5 from the intake side location, and the spark plug 11 is arranged so as to open at the combustion chamber 5 from the top. The spark plug 11 is electrically connected to an ignition circuit device 12 to generate an electric power for the spark. The spark is supplied from the plug 11 at a specified timing according to the electric power supply from the ignition circuit device 12.

Further, as shown in FIG. 2, an engine speed sensor 61 to detect a rotational speed of the crankshaft 3 and a water temperature sensor 62 to detect the temperature of cooling water of the engine are provided at the engine body 1.

An intake passage 13 and an exhaust passage 19 are connected to the intake port 6 and the exhaust port 7 of the engine body 1, respectively. The intake passage 13, which is a passage for supplying the air for combustion into the combustion chamber 5, comprises plural branch passage portions 14 and an upstream common passage portion 15 as shown in FIG. 1. The exhaust passage 19, which is a passage for exhausting the combusted gas (exhaust gas) generated in the combustion chamber 5, comprises plural branch passage portions 20 and an upstream common passage portion 21 like the intake passage 13.

Figure 3:
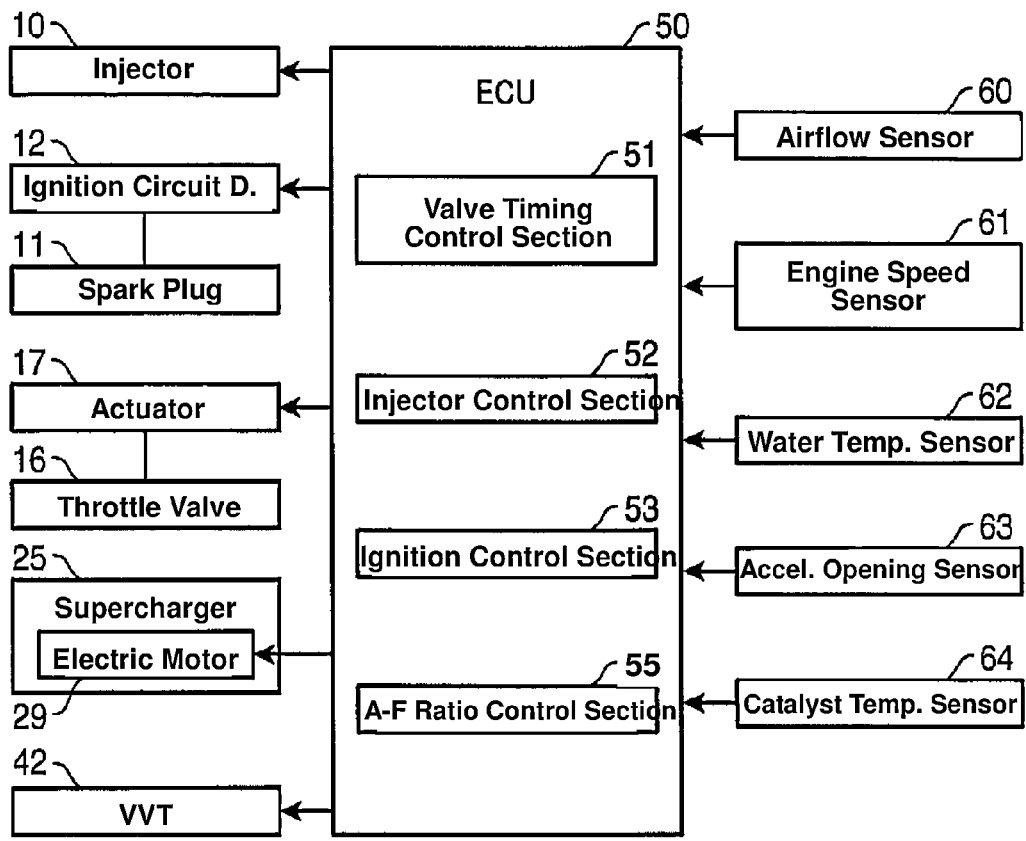
FIG. 3 is a block diagram showing a control system of an engine.

An airflow sensor 60 to detect the flow amount of the intake air passing down the common passage portion 15 is arranged in the common passage portion 15 of the intake passage 13 at a location which is upstream of a compressor 27 which will be described below. Further, a throttle valve 16 to adjust the intake air amount is arranged in the common passage portion 15. This throttle valve 16 is an electrically-controlled valve which is driven (opened or closed) by an actuator 17. That is, an opening of an accelerator, not illustrated, to be pressed by a driver is detected by an accelerator opening sensor 63 (FIG. 3). An ECU 50 (FIG. 3), which will be described later, calculates an appropriate opening of the throttle valve 16 based on the detected accelerator opening and the engine operating condition, and a drive signal according to this calculated throttle-valve opening is inputted to the actuator 17 so as to adjust the throttle valve 16.

A catalyst converter 24 which stores a three-way catalyst therein is arranged in the common passage portion 21 of the exhaust passage 19 so that toxic substances in the exhaust gas flowing down in the exhaust passage 19 can be purified by the catalyst converter 24. Further, a catalyst temperature sensor 64 (corresponding to the catalyst-temperature detecting device of the present invention) to detect the temperature of the catalyst (three-way catalyst) is arranged in the catalyst converter 24.

The exhaust passage 19 from the catalyst converter 24 to the engine body 1, that is, the branch passage portions 20 from the cylinders 1A-1D and the common passage portion 21 from the collective portion to the catalyst converter 24 have a double-pipe structure with plural pipe walls, respectively. This double-pipe structure is applied to increase the heat insulation function of the exhaust passage 19 so that the temperature of the exhaust gas flowing into the catalyst converter 24 can be kept higher. That is, since the engine of the present embodiment operates under the combustion conditions with the properly-high thermal efficiency as described below, its exhaust gas temperature becomes lower than that of the normal gasoline engine, so that there is a concern that the temperature of the catalyst in the exhaust passage 19 might decrease below its active temperature (about 600K for the three-way catalyst). Accordingly, the structure of the exhaust passage 19 from the catalyst converter 24 to the engine body 1 is formed in the double-pipe structure with plural pipe walls as a countermeasure for restraining the temperature decrease of the catalyst.

As shown in FIG. 1, a supercharger 25 to pressurize the intake air is provided at the engine of the present embodiment. The supercharger 25 comprises a turbine 26 which is arranged in the common passage portion 21 of the exhaust passage 19, a compressor 27 which is arranged in the common passage portion 15 of the intake passage 13, a connecting shaft 28 which interconnects the turbine 26 and the compressor 27, and an electric motor 29 which rotates the connecting shaft 28. When the turbine 26 is rotated by energy of the exhaust gas, the compressor 27 is driven and rotated at a high speed. Thereby, the air (intake air) passing through the intake passage 13 is pressurized and supplied into the combustion chamber 5. Herein, the rotation of the compressor 27 may be assisted at need by a drive of the electric motor 29.

Herein, the compressor 27 is comprised of a relatively large-sized impeller, and the supercharger 25 with the large-sized compressor 27 can perform a high supercharging in a high engine-speed or high engine-load area where the energy of the exhaust gas becomes large. Further, the assist by the electric motor 29 is conducted at need, so that the intake air can be pressurized quickly.

An intercooler 18 to cool the air warmed up by the supercharging is arranged in the common passage portion 15 at a location which is downstream of the compressor 27. A bypass pipe 22 to bypass the turbine 26 of the supercharger 25 is provided at the common passage portion 21 of the exhaust passage 19. A bypass valve 23 is arranged in the bypass pipe 22 to adjust the bypass amount of the exhaust gas, so that a boost pressure of the supercharger 25 can be controlled.

FIG. 3 is a block diagram showing a control system of the engine. ECU 50 shown in this figure is a control device to control various components of the engine, which comprises CPU, ROM, RAM and others which are well known.

Detection signals from various sensors are inputted to the ECU 50. That is, the above-described airflow sensor 60, engine speed sensor 61, water temperature sensor 62, accelerator opening sensor 63, and catalyst temperature sensor 64 are electrically coupled to the ECU 50, and thus the detection signals from these sensors are inputted to the ECU 50. Further, the ECU 50 is also electrically coupled to the above-described injector 10, ignition circuit device 12 for the spark plug 11, actuator 17 for the throttle valve 16, electric motor 29 for the supercharger 25, and VVT 24 so as to output control signals to these devices.

The above-described ECU 50 has, as its major functions, a valve timing control section 51, an injector control section 52, an ignition control section 53, a supercharge control section 54, and an air-fuel ratio control section 55.

The valve timing control section 51 controls the operation of the VVT 42 so that the closing timing of the intake valve 8 can be changed according to the engine operating condition. That is, the intake valve 8 is generally closed at a specified timing which is near the intake bottom dead center on a retard side (i.e., at a specified timing slightly after the intake bottom dead center), but its closing timing is set at a timing which is considerably retarded from the intake bottom dead center by the VVT 42 driven by the valve timing control section 51 according to the engine operating condition. Thereby, the substantial start timing of the compressive stroke of the engine is retarded, so that the compression ratio (effective compression ratio) of the engine decreases accordingly. Thus, a means for setting the engine's compression ratio variably (compression-ratio adjusting means) in the present embodiment is comprised of the VVT 42 to change the closing timing of the intake valve 8 and the valve timing control section 51 to control the operation of the VVT 42. Herein, since the geometrical compression ratio of the engine of the present embodiment is about 18 as described above, the above-described compression-ratio adjusting means having the VVT 42 and the valve timing control section 51 sets the effective compression ratio to be variable in the range of 18 or smaller.

The injector control section 52 controls the fuel injection operation of the injector 10 so that the injection timing and the injection amount (injection period) of the fuel which is injected by the injector 10 into the combustion chamber 5 can be controlled. Further, this injector control section 52 controls a combustion period (a crank-angle range from the start to the end of a combustion reaction) of the air-fuel mixture in the combustion chamber 5 by changing the fuel injection timing or dividing the fuel injection into the plural injection times at need. For example, in case the fuel injection from the injector 10 is divided into the plural injection times, mixing of the air-fuel mixture in the combustion chamber 5 is promoted properly, so that the combustion period can be shortened properly. Thus, the combustion period can be set within a preferable crank-angle range.

The ignition control section 53 controls the electric power supply to the spark plug 11 from the ignition circuit device 12 so that the spark timing of the spark plug 11 (ignition timing) and the other can be controlled.

The air-fuel ratio control section 55 adjusts the amount of intake air to be mixed with the fuel injected from the injector 10 so that the air-fuel ratio of the air-fuel mixture generated in the combustion chamber can be controlled. Specifically, the air-fuel ratio control section 55 controls the opening of the throttle valve 16 and the amount of supercharging for adjusting the amount of intake air so that the air-fuel mixture having a preferable air-fuel ratio can be generated. Herein, the control of the amount of supercharging is conducted by driving or stopping the electric motor 29 for the supercharger 25 at needs or adjusting the amount of the exhaust gas flowing in the turbine 26 of the supercharger 25 by controlling the bypass valve 23.

(2) Specific Example of Engine Combustion Control

Figure 4:
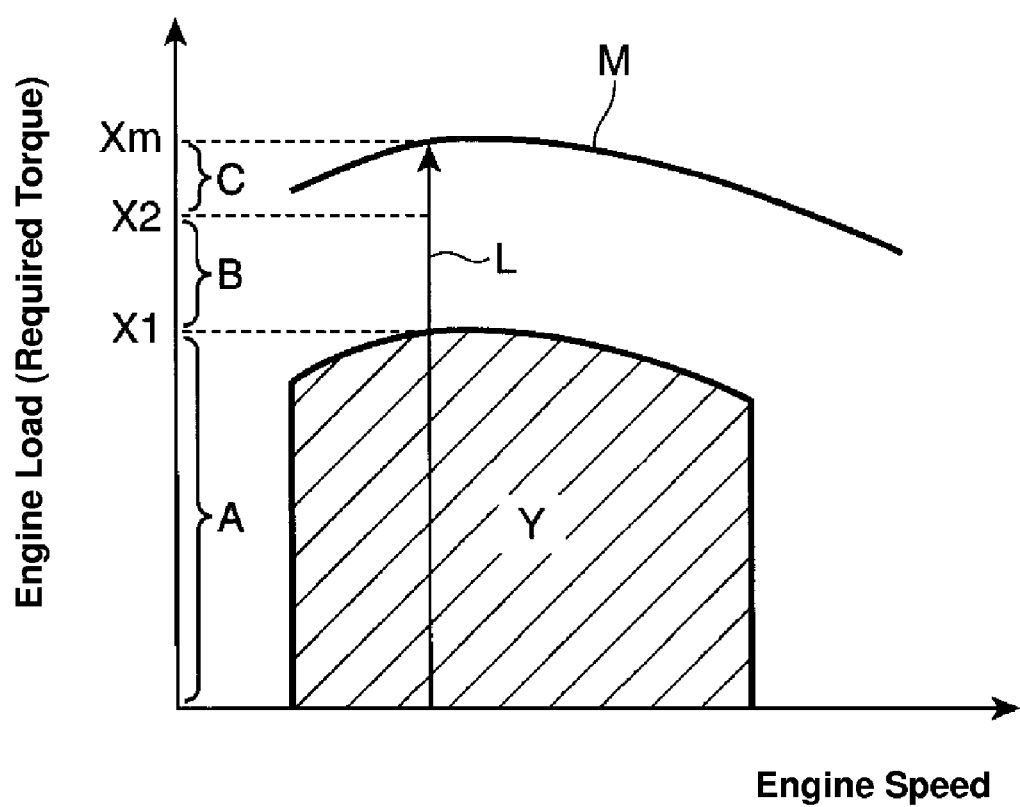
FIG. 4 is an exemplified control map to be referred in controlling combustion of the engine.

FIG. 4 is an exemplified control map to be referred in controlling combustion of the engine by the ECU 50. In this map, an area Y which is set except the high engine-speed and high engine-load area is an area where the temperature of the exhaust gas from the combustion chamber 5 is relatively low. When it is determined that the temperature of the catalyst in the catalyst converter is lower than a specified temperature (a first temperature T1 which will be described) in case the engine operating condition is in this area Y, the control of changing the combustion conditions in the area Y is executed so that the exhaust gas temperature can be increased. Hereinafter, the above-described area Y (corresponding to a specified operating area according to the present invention) where the control for the increase of the exhaust gas temperature is executed will be referred to as the "specified area Y" The specific control in this specified area Y will be described in detail.

FIGS. 5A-5E are diagrams showing how a compression ratio (effective compression ratio) $\epsilon$ of the engine, an excess air ratio $\lambda$ relative to the stoichiometric air/fuel ratio, an ignition timing $\theta ig$ by the spark plug 11, a combustion period $\Delta\theta$ of the air-fuel mixture, and a supercharge amount QC by the supercharger 25 change according to the engine load (a required torque based on the accelerator opening) in case the engine operating condition changes along a line L (an equal engine-speed line) in FIG. 4. In these diagrams, an engine load value X1 shows an upper limit of the engine load of the specified area Y, and an engine load value Xm shows the maximum engine load (the value on the maximum load line M in FIG. 4). Further, an engine load value X2 is set between these values X1 and Xm, and the engine load values X1, X2 are thresholds of the engine load for changing either one of the control parameters of the above-described $\epsilon$, $\lambda$ and others. Hereinafter, the values X1 and X2 will be referred to as a "first engine-load" and a "second engine-load." Further, the range from the zero (nun) engine-load to the first engine-load (i.e., the range corresponding to the whole engine-load area of the specified area Y) will be referred to as "engine-load area A," the range from the first engine-load X1 to the second engine-load X2 will be referred to as "engine-load area B," and the range from the second engine-load X2 to the maximum engine-load Xm will be referred to as "engine-load area C."

Figure 5A:
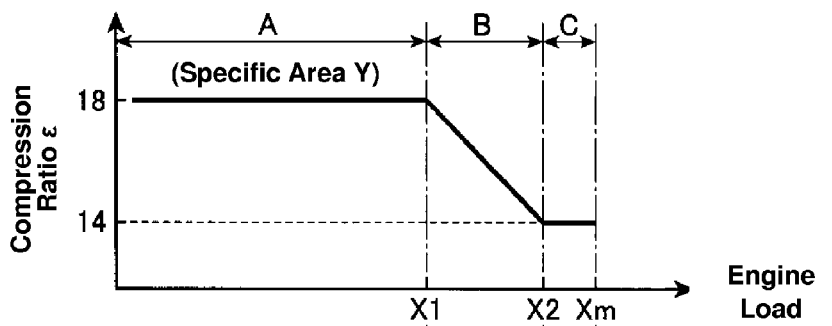
FIGS. 5A-5E are diagrams showing exemplified controls of a compression ratio, an excess air ratio, an ignition timing, a combustion period, and a supercharge amount of the engine.

First, the control of the compression ratio $\epsilon$ will be described referring to FIG. 5A. The compression ratio $\epsilon$ is maintained at a constant value of $\epsilon=18$ in the engine-load area A from the zero (nun) engine load to the first engine-load X1. When the engine operating condition moves to the engine-load area B above the first engine-load X1, the compression ratio $\epsilon$ is decreased gradually according to the increase of the engine load, and it is set at $\epsilon=14$ at the second engine-load X2. Then, when the engine load becomes greater than the second engine-load X2, the compression ratio $\epsilon$ is maintained at $\epsilon=14$ constantly until reaching the maximum engine load Xm.

Figure 5B:
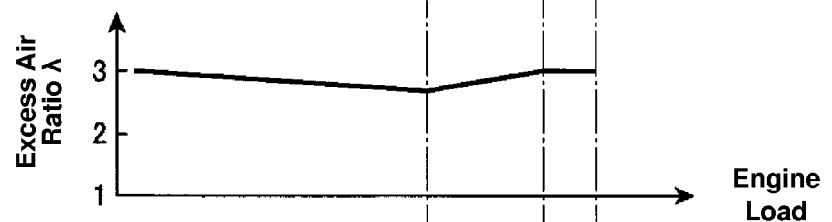

With respect to the excess air ratio $\lambda$ relative to the stoichiometric air/fuel ratio, as shown in FIG. 5B, $\lambda$ is set at 3 or at a specified value slightly smaller than 3 in the whole area of the engine load (the range from the zero engine-load to the maximum engine-load Xm). In this example shown in the figure, as the engine load becomes higher in the engine-load area A, the excess air ratio becomes smaller gradually from $\lambda=3$, and then it becomes greater up to $\lambda=3$ in the areas B, C. This is because while the fuel-injection amount is increased according to the engine load, the supercharge amount QC cannot be increased in complete proportion to this. For example, since the supercharge function is not so high in the engine-load area A below the first engine-load X1 (see FIG. 4E), the excess air ratio $\lambda$ gradually decreases (making the air-fuel mixture rich) according to the increase of the fuel injection caused by the engine load becoming higher. Meanwhile, in the engine-load areas B, C where the sufficient supercharge function can be performed, the enough amount of air is supplied to into the combustion chamber 5, so that the excess air ratio $\lambda$ increases again up to $\lambda=3$. Thus, the value of the excess air ratio $\lambda$ changes to a certain degree, but it does not decrease below $\lambda=2$, and it is maintained at a specified value which is near $\lambda=3$ in the whole area of the engine load according to the example shown in the figures. Accordingly, hereinafter, the setting value of the excess air ratio $\lambda$ which is nearly equal to 3 according to the present embodiment will be indicated simply as "$\lambda\equiv3$", without differentiation according to the engine load.

Figure 5C:
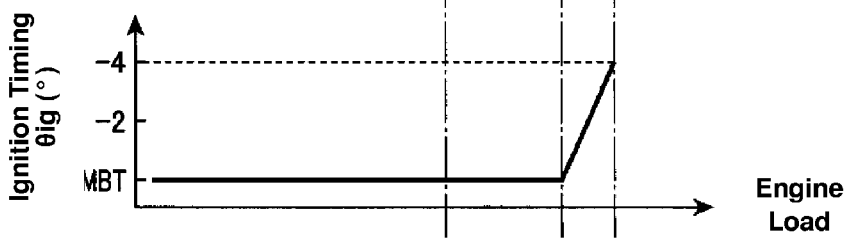

With respect to the ignition timing $\theta$ig of the spark plug 11, as shown in FIG. 5C, the ignition timing is maintained at the timing of MBT (Minimum Advance for Best Torque) to provide the maximum torque in the areas A and B from the zero (nun) engine-load to the second engine-load X2. When the engine operating condition moves to the engine-load area C above the second engine-load X2, the ignition timing $\theta$ig is gradually retarded according to the increase of the engine load, so that the ignition timing is retarded from the timing of MBT by 4° at the maximum engine-load Xm. Herein, in theory, the ignition timing of MBT to provide the maximum torque should have only one (single) crank angle, but herein the timing of MBT of the present invention means a crank angle having a certain degree of tolerance, such as of $\pm1°$, for example.

Figure 5D:
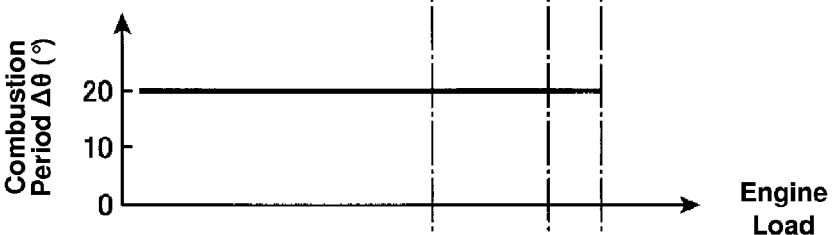

With respect to the combustion period $\Delta\theta$ of the air-fuel mixture, as shown in FIG. 5D, the combustion period is maintained at $\Delta\theta=20°$ in crank angle in the whole area of the engine load.

Figure 5E:
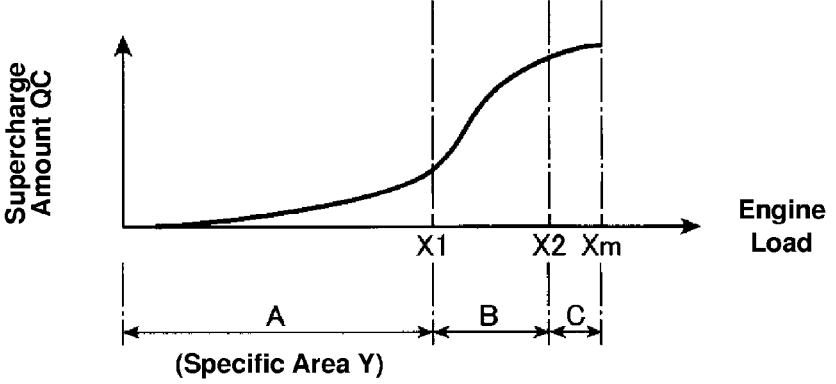

Finally, with respect to the supercharge amount QC, as shown in FIG. 5E, while the supercharge amount QC is gradually increased according to the engine load, when the engine load becomes greater than the first engine-load X1 (the engine-load areas B and C) where the compression ratio $\epsilon$ starts to decrease, the sufficient supercharging is performed so that the supercharge amount QC can be increased greatly.

(3) Temperature Control of Catalyst

In case the engine operates with the control characteristics shown in FIGS. 5A-5E, the thermal efficiency becomes high and the exhaust gas temperature becomes lower compared with the normal engine (details will be described later in "B. Inspection of Embodiment"). Accordingly, in the engine of the present embodiment, the temperature of the catalyst in the catalyst converter 24 tends to become lower compared with the normal engine, so that the catalyst temperature is highly likely to decrease below the active temperature of the catalyst. Especially, the engine load is relatively small, and the proper combustion conditions from the thermal-efficiency aspect are maintained as the compression ratio=18, the excess air ratio $\lambda\equiv3$, the ignition timing=MBT timing, and the combustion period $\Delta\theta=20°$ in crank angle in the above-described specified area Y which is set within the engine-load area A from the zero (nun) engine-load to the first engine-load X1. Accordingly, the exhaust gas temperature becomes so low that the engine of the present embodiment may be inferior in keeping the catalyst temperature properly high compared with the other engine operating area.

Figure 6:
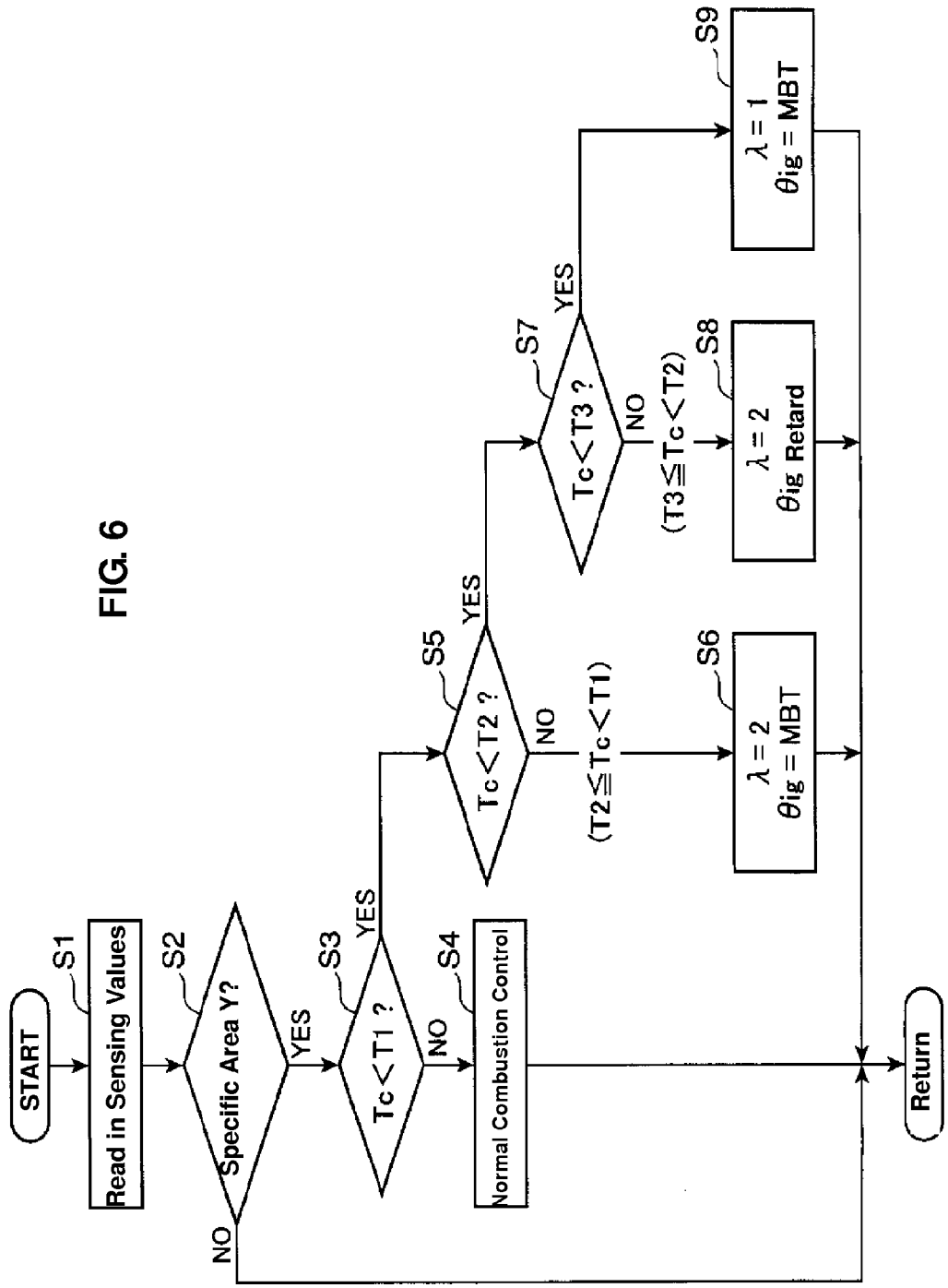
FIG. 6 is a flowchart to explain a control executed in a specified area on the control map.

Of course, in the present embodiment, the greatly decreasing of the exhaust gas temperature is prevented prior to the exhaust gas flowing in the catalyst converter 24 by improving the heat insulation with the double-pipe structure of the exhaust passage 19 from the engine body 1 to the catalyst converter 24 shown in FIG. 1. However, in case, for example, the engine idling lasts very long or the fuel cut during the engine deceleration is conducted very often, the likelihood of the catalyst temperature decreasing below the catalyst's active temperature may become high. Therefore, according to the present embodiment, the following controls shown in FIG. 6 are executed according to the catalyst temperature from the catalyst temperature sensor 64 when the engine operating condition is in the above-described specified area A, so that it can be prevented that the catalyst temperature improperly decreases below the catalyst's active temperature.

The controls which are executed by the ECU 50 in the specified area Y will be described referring to a flowchart of FIG. 6. After the start of the flowchart, the various sensing values are read in (step S1). Specifically, the intake air amount of the engine, the engine speed, the cooling water temperature, the engine load (required torque), and the temperature of the catalyst in the catalyst converter 24 are read in based on the detection values of the airflow sensor 60, engine speed sensor 61, water temperature sensor 62, accelerator opening sensor 63, and catalyst temperature sensor 64. Hereinafter, the catalyst temperature detected by the catalyst temperature sensor 64 will be referred to as "catalyst temperature Tc."

Next, it is determined based on the sensing values read in the step S1 whether or not the current engine operating condition (engine load and speed) is in the specified area Y in the control map of FIG. 4 (step S2). When it is determined that the current engine operating condition is in the specified area Y and thus the answer to the step S2 is YES, it is then determined whether or not the catalyst temperature Tc read in the step S1 is lower than the predetermined first temperature T1 (step S3). Herein, the first temperature T1 corresponds to the specified temperature according to the present invention, which may be higher than about 600K of the active temperature of the catalyst in the catalyst converter 24 by a specified value (about 650K, for example).

When it is determined that the catalyst temperature Tc is lower than the first temperature T1 (Tc<T1) and thus the answer to the step S3 is YES, it is further determined whether or not the catalyst temperature Tc is lower than a second temperature T2 which is lower than the first temperature T1 (step S5). Herein, the second temperature T2 is set to be lower than the first temperature T1 and higher than the active temperature of the catalyst (about 630K, for example). Meanwhile, it is determined that the catalyst temperature Tc is the first temperature T1 or higher (Tc≧T1) and thus the answer to the step S3 is NO, the normal control to be originally executed in the specified area Y, that is, the combustion control according to the setting values of the various combustion parameters ($\epsilon=18$, $\lambda\equiv3$, $\theta ig$=MBT timing, $\Delta\theta=20°$) shown in FIG. 5 is executed (step S4).

When it is determined that the catalyst temperature Tc is lower than the second temperature T2 (Tc<T2) and thus the answer to the step S5 is YES, it is further determined whether or not the catalyst temperature Tc is lower than a third temperature T3 which is lower than the second temperature T2 (step S7). Herein, the third temperature T3 is set to be lower than the second temperature T2 and higher than the active temperature of the catalyst (about 610K, for example). Meanwhile, it is determined that the catalyst temperature Tc is the second temperature T2 or higher and lower than the first temperature T1 (T2≦Tc<T1) and thus the answer to the step S5 is NO, the control of making the air-fuel mixture rich by decreasing the excess air ratio $\lambda$ from $\lambda\equiv3$ to $\lambda=2$ is executed (step S6). Herein, the other parameters than the excess air ratio $\lambda$ are maintained at the setting values shown in FIG. 5 without changing. Accordingly, the ignition timing $\theta ig$ is maintained at the MBT timing in the same manner as the step S4 (the normal combustion control).

It is determined that the catalyst temperature Tc is the third temperature T3 or higher and lower than the second temperature T2 (T3≦Tc<T2) and thus the answer to the step S7 is NO, the control of making the air-fuel mixture rich by decreasing the excess air ratio $\lambda$ from $\lambda\equiv3$ to $\lambda=2$ and retarding the ignition timing $\theta ig$ from the MBT timing is executed (step S8). Meanwhile, when it is determined that the catalyst temperature Tc is lower than the third temperature T3 (Tc<T3) and thus the answer to the step S7 is YES, the control of decreasing the excess air ratio $\lambda$ further to $\lambda=1$ (the stoichiometric air/fuel ratio) and setting the ignition timing $\theta ig$ at the MBT timing again is executed (step S9). Herein, the above-described decreasing of the excess air ratio $\lambda$ to $\lambda=1$ (the control of decreasing $\lambda=2\rightarrow1$) is conducted (executed) promptly, substantially without taking any middle value between $\lambda=2$ and $\lambda=1$ in changing the $\lambda$ control.

As described above by referring to the flowchart of FIG. 6, according to the present embodiment, when it is determined that the engine operating condition is in the specified area Y and the catalyst temperature Tc is lower than the predetermined first temperature T1, three kinds of control of the steps S6, S8 and S9 is executed according to how much the catalyst temperature Tc is lower than the first temperate T1 (that is, according to relative differences from the first, second and third temperatures T1, T2 and T3). In the controls of these steps, the ignition timing $\theta ig$ is maintained at the MBT timing (the timing to provide the maximum torque) or retarded from this MBT timing and also the excess air ratio $\lambda$ is decreased to the smaller value (that is, $\lambda=2$ or $\lambda=1$) from $\lambda\equiv3$ (that is, nearly $\lambda=3$). Thereby, the exhaust gas temperature is increased so much that the catalyst temperature Tc can be prevented from improperly decreasing below the active temperature excessively.

B. Verification of Embodiment
(1) Improvement of Thermal Efficiency
(1-1) Principle At first, the combustion control of the engine according to the above-described embodiment is verified from an improvement aspect of thermal efficiency of the engine. According to the research by the inventors of the present invention, any occurrence of knocking or any increase of combustion noise can be possibly prevented, maintaining the engine's thermal efficiency at a higher value, by controlling the engine with the control characteristics shown in FIGS. 5A-5E. Hereinafter, this research conducted by the inventors will be described.

Figure 7:
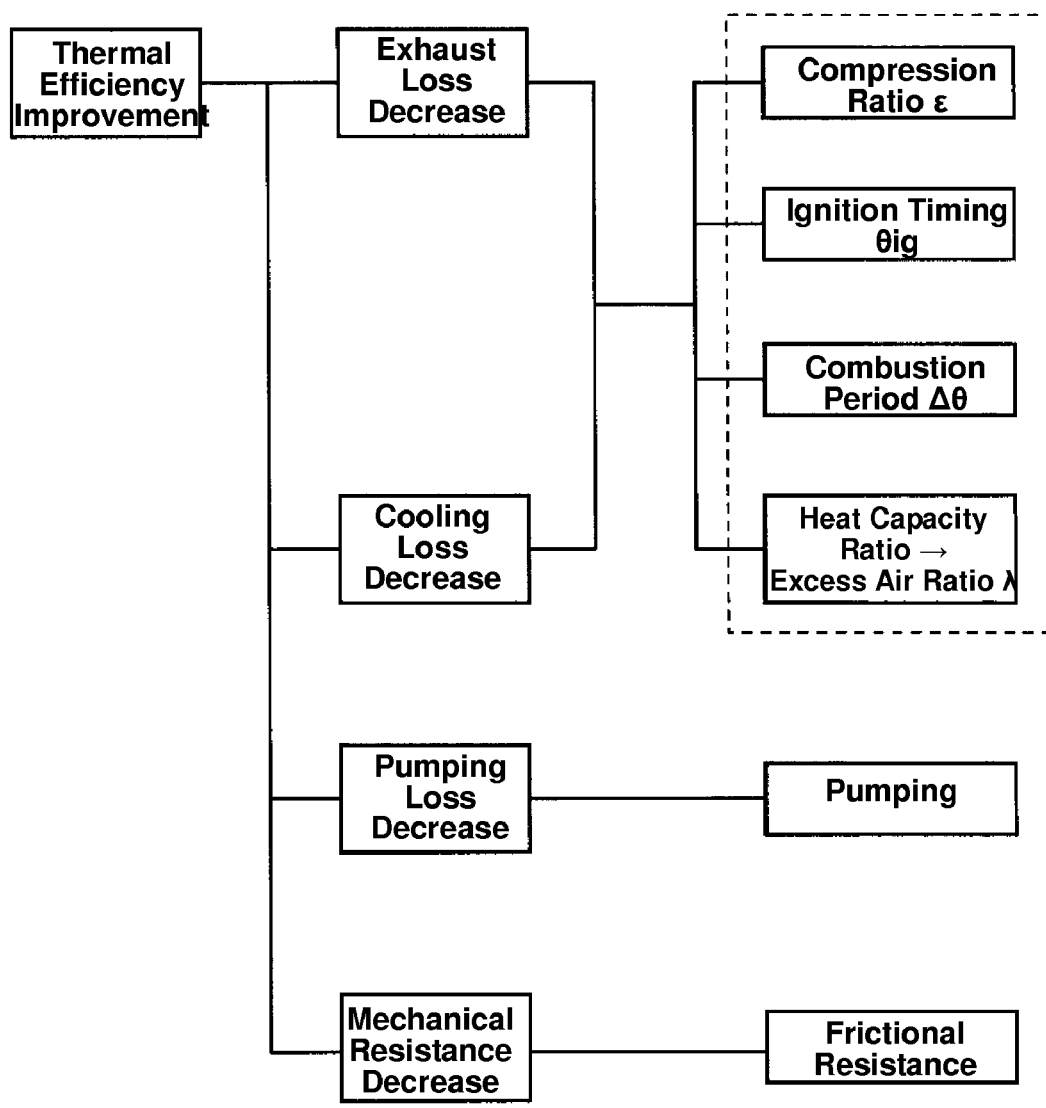
FIG. 7 is a diagram showing various loss factors to affect a thermal efficiency of the engine and various control parameters related to the loss factors.

As shown in FIG. 7, at least one of four loss factors of the exhaust loss, the cooling loss, the pumping loss and the mechanical loss may be required to be reduced in order to improve the engine's thermal efficiency. The inventors paid attention to two factors of the exhaust loss and the cooling loss, and conducted the research about how to effectively improve the thermal efficiency by controlling the compression ratio $\epsilon$, the ignition timing $\theta ig$, the combustion period $\Delta\theta$, or the heat capacity ratio. Herein, the heat capacity ratio is related to the excess air ratio $\lambda$ of the air-fuel mixture, so hereinafter the excess air ratio $\lambda$ will be taken as a parameter to control the excess air ratio $\lambda$ in place of the heat capacity ratio.

(1-2) Verification of Thermal Efficiency in Partial Engine-Load Area

Figure 8:
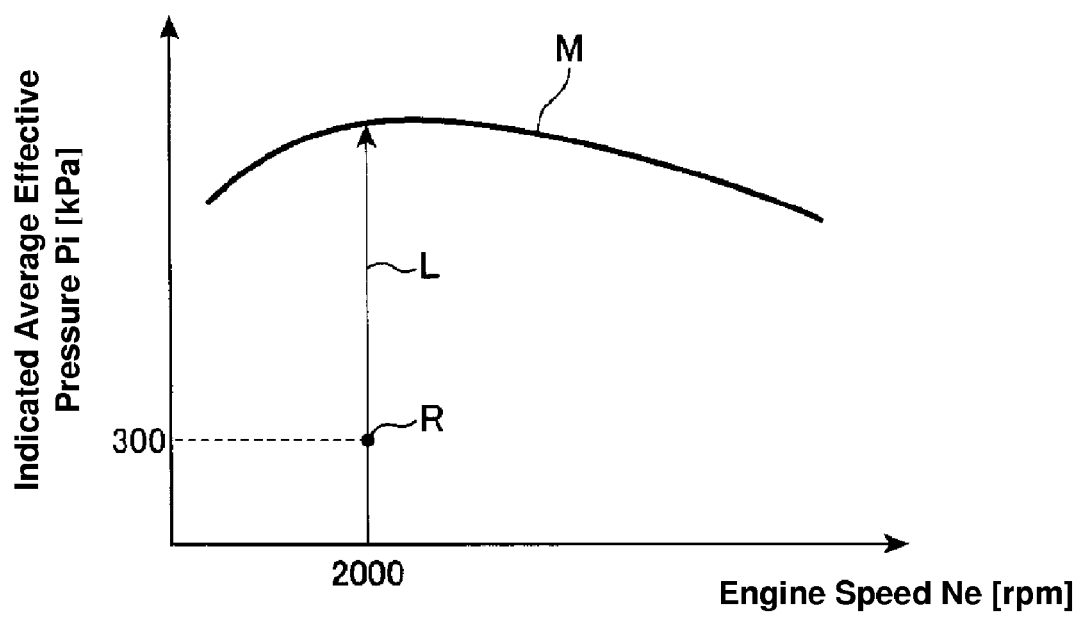
FIG. 8 is a diagram showing an operating area of the engine and its representative point.
Figure 9:
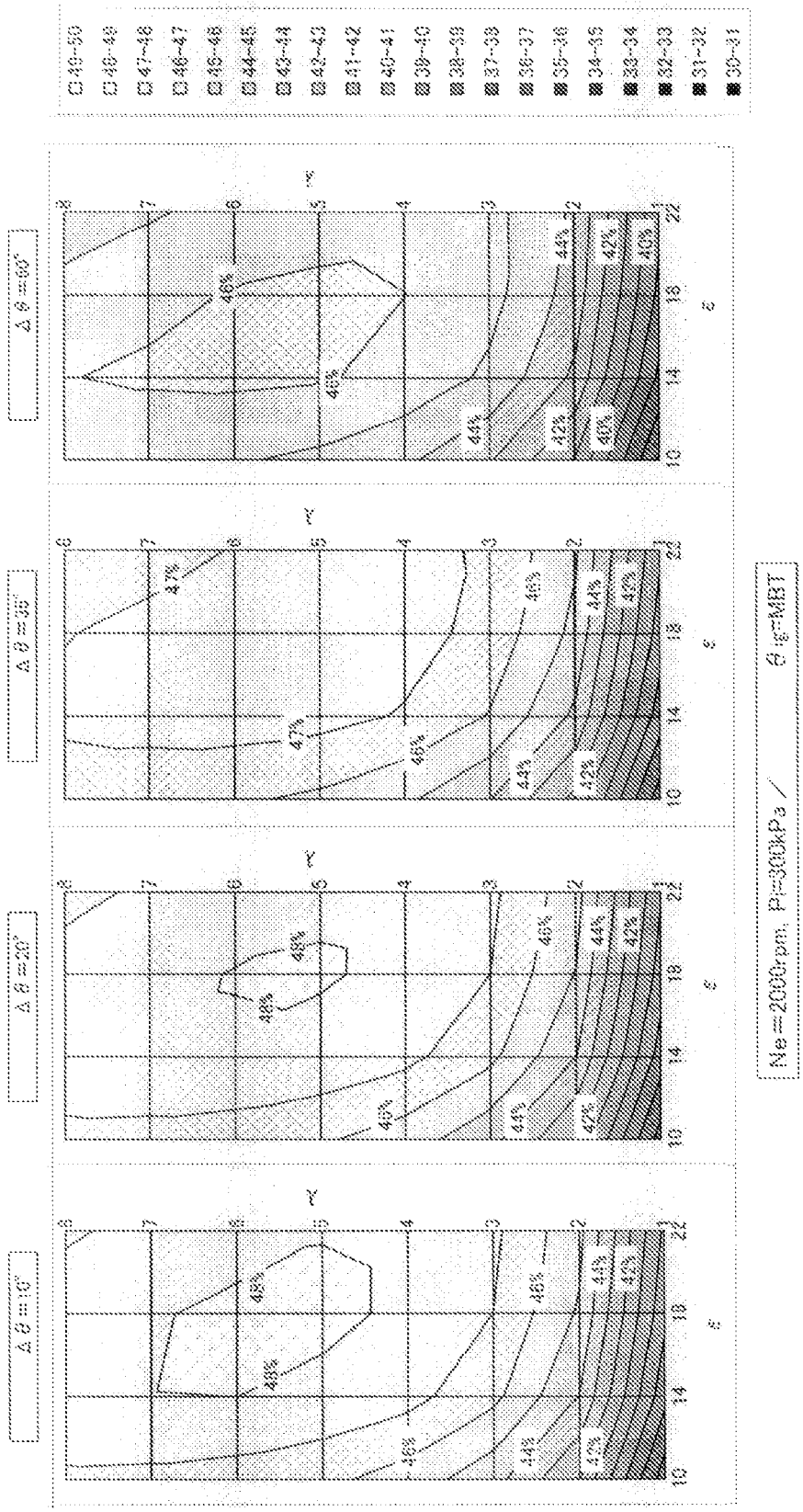
FIG. 9 is diagrams showing calculation results of an indicated thermal efficiency at the representative point in relation to the various parameters of the compression ratio, the excess air ratio and others.

FIG. 9 is diagrams showing calculation results of the thermal efficiency (indicated thermal efficiency) in case the compression ratio $\epsilon$, the excess air ratio $\lambda$ relative to the stoichiometric air-fuel ratio, and the combustion period $\Delta\theta$ of the air-fuel mixture are changed respectively at the representative point R set in the engine's partial engine-load area (see FIG. 8). Herein, the calculation results show the thermal efficiency in case the engine operates at the representative point R of the engine speed Ne=2000 rpm and the indicated average effective pressure Pi=300 kPa as shown in FIG. 8. Further, the ignition timing $\theta ig$ is set to be constant at the timing of MBT (the timing to provide the maximum torque).

The thermal efficiencies in case of setting the combustion period $\Delta\theta$ at $10°$, $20°$, $35°$ and $60°$ in crank angle respectively are shown from left in FIG. 9. According to FIG. 9, the maximum values of the indicated thermal efficiency in case of $\Delta\theta=60°$ and $\Delta\theta=35°$ are about 46% and 47%, respectively, and the maximum value in case of $\Delta\theta=10°$, $20°$ is about 48%. Accordingly, it can be understood that the combustion period $\Delta\theta$ should be set at $10°$-$20°$ for the increase of the thermal efficiency.

However, the range of the maximum value (48%) of the indicated thermal efficiency in case of $\Delta\theta=10°$ is slightly wider than that in case of $\Delta\theta=20°$, and thus there is no big difference in their distributions as a whole. This means that even if the combustion period $\Delta\theta$ is shortened from $20°$ to $10°$, little improvement of the thermal efficiency can be obtained. This is because the shortened combustion period may raise the increase rate of the cylinder internal pressure/temperature, so that the cooling loss may increase improperly. Further, the shortening of the combustion period $\Delta\theta$ to $10°$ may cause some difficulty in controlling actually. For these reasons, it may be said that $\Delta\theta=20°$ in crank angle is a target of the combustion period to be achieved.

In case $\Delta\theta=20°$ is set as described above, the values of the compression ratio $\epsilon$ and the excess air ratio $\lambda$ which can obtain the maximum value of the indicated thermal efficiency (48%) are $\epsilon=18$ and $\lambda=5$ according to its corresponding graph (the second graph from left). According to the above-described graph, however, the improvement of the thermal efficiency by changing the excess air ratio $\lambda$ in case of the compression ratio $\epsilon=18$ is seen only in a range up to about $\lambda=3$, and the improvement of the thermal efficiency in case of a range over the excess air ratio $\lambda=3$ is very slow. For example, when the excess air ratio $\lambda$ is increased as $\lambda=2\rightarrow3$ in case of the compression ratio $\epsilon=18$, the thermal efficiency is increased from 45% to 47% (2% improvement). However, even if the excess air ratio λ is increased greatly as λ=3→5, the thermal efficiency may improve only up to 48% (only about 1% improvement).

Figure 10:
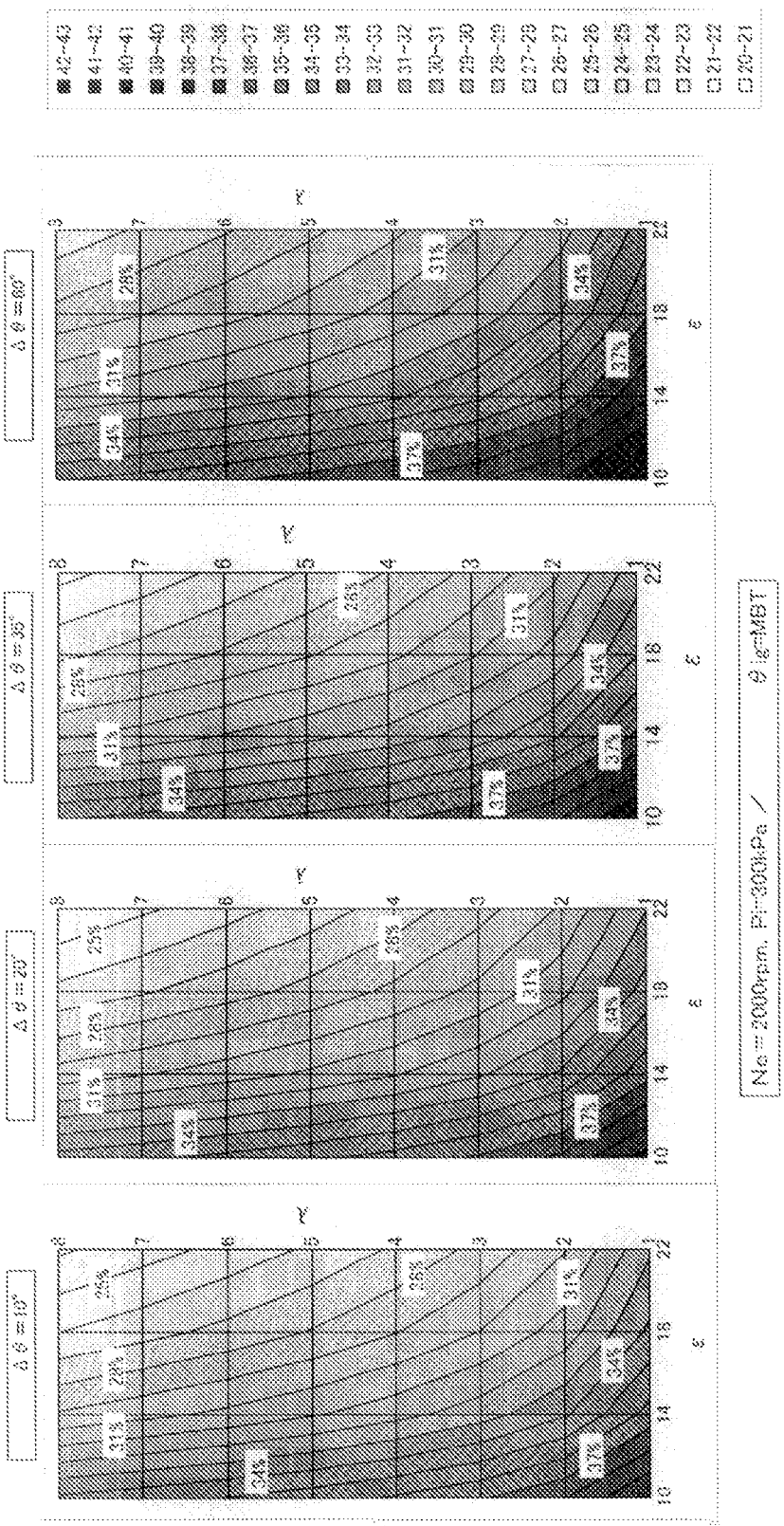
FIG. 10 is diagrams showing calculation results of an exhaust loss at the representative point in relation to the various parameters of the compression ratio, the excess air ratio and others.
Figure 11:
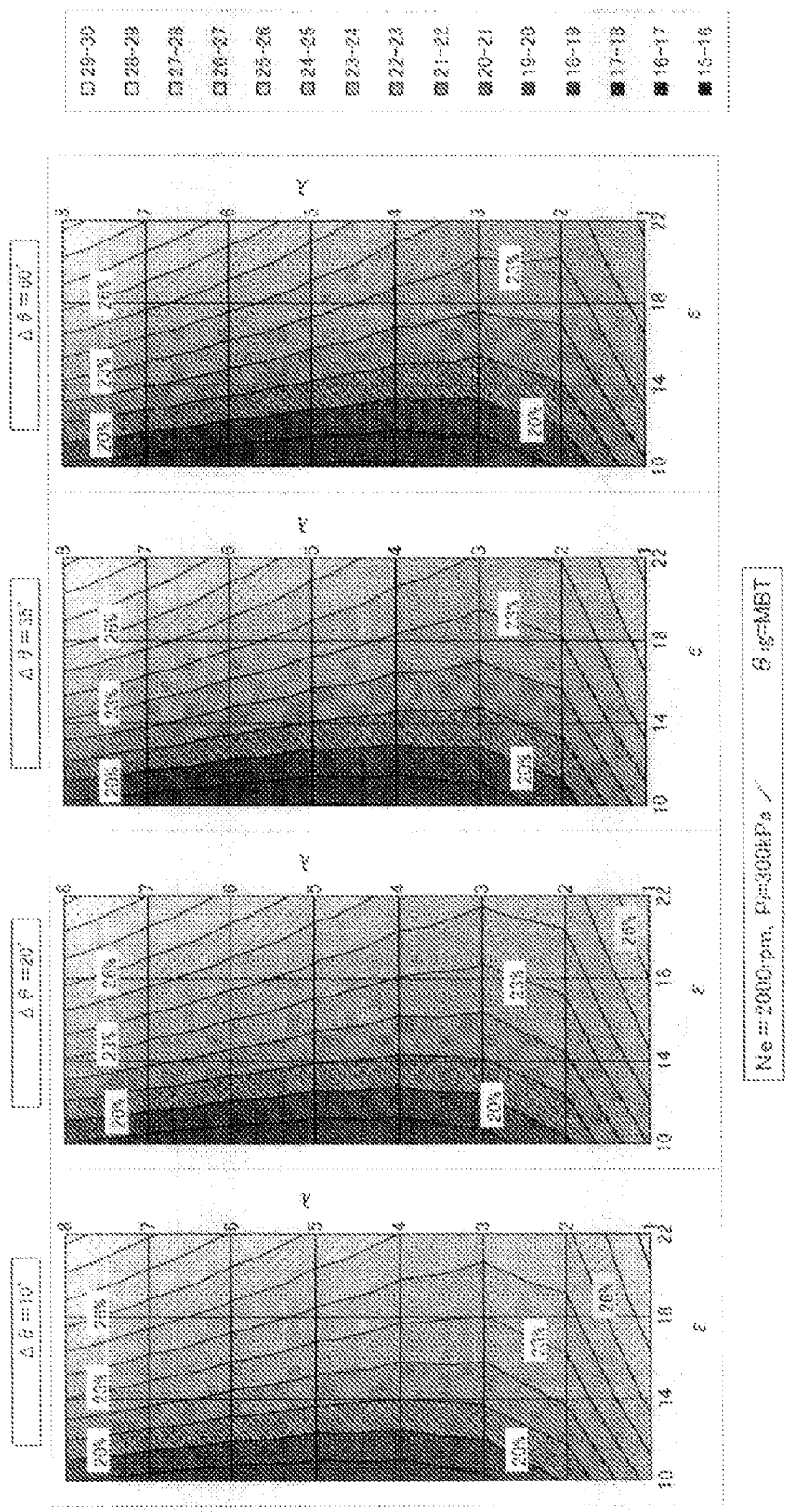
FIG. 11 is diagrams showing calculation results of a cooling loss at the representative point in relation to the various parameters of the compression ratio, the excess air ratio and others.

Thus, when the excess air ratio λ exceeds 3, the improvement of the thermal efficiency becomes very slow. Hereinafter, this reason will be examined. FIGS. 10 and 11 are diagrams showing calculation results of the exhaust loss and the cooling loss which occurred when the engine operated under the same conditions as FIG. 9.

At first, with respect to the exhaust loss of the engine, as shown in FIG. 10, it can be understood that the exhaust loss becomes smaller in case the combustion period Δθ is shorter, the compression ratio ε is higher, and the excess air ratio λ is greater. This is because the shorter combustion period Δθ and the greater compression ratio ε may prolong the expansion period after the combustion and thereby take out more works, so that the energy having escaped into the exhaust gas may lessen. This is also because the greater excess air ratio λ (that is, the leaner air-fuel ratio) may decrease the exhaust gas temperature, so that the energy having escaped into the exhaust gas may lessen. That is, according to FIG. 10, it can be understood that in case of the same combustion period and the same compression ratio, the greater the excess air ratio λ is, the less the exhaust loss is. Accordingly, it can be considered that the above-described saturation phenomenon of the thermal efficiency (the phenomenon of the slow improvement of the thermal efficiency over λ=3) seen in FIG. 9 may not be caused by the exhaust loss.

Meanwhile, with respect to the cooling loss of the engine, as shown in FIG. 11, the cooling loss becomes greater in case the combustion period Δθ is shorter and the compression ratio ε is higher. Further, it can be understood that while the cooling loss becomes smaller in case the excess air ratio λ is greater in the range below λ=3, the cooling loss turns to increase in the range over λ=3. Thus, since the cooling loss increases in the range over λ=3, it can be considered that the saturation phenomenon of the thermal efficiency seen in FIG. 9 may be caused by this cooling loss.

Next, the cause of the increase of the cooling loss in the range of the excess air ratio λ>3 will be considered. A cooling loss Fc may be obtained from the following equation (1).

$$Fc = \alpha S(T-Tw) \quad (1)$$

Herein, α is a thermal transmission coefficient, S is a combustion-chamber surface area, T is a gas temperature, and Tw is a combustion-chamber wall temperature.

In this equation (1), the combustion-chamber surface area S has a constant value for the same type of engine, and the combustion-chamber wall temperature Tw is always maintained at 100° by the cooling water of the engine, so that these values may not change basically. Meanwhile, the thermal transmission coefficient α and the gas temperature T are changeable depending on the combustion conditions. Herein, the gas temperature T becomes lower in case the excess air ratio λ is greater, so that the cooling loss Fc may becomes smaller in proportion. Accordingly, it can be considered that the cause of the increase of the cooling loss Fc in the range of λ>3 is the thermal transmission coefficient α.

Herein, the thermal transmission coefficient α may be obtained from the following equation (2).

$$\alpha = 0.013 D^{-0.2} P^{0.8} T^{-0.53} [2.28 Up + c(P-Pm)]^{0.8} \quad (2)$$

Herein, D is a cylinder-bore size, P is an internal pressure of the combustion chamber (a cylinder internal pressure), Up is an average piston speed, c is a combustion initial condition coefficient, and Pm is a mortaring pressure.

Figure 12:
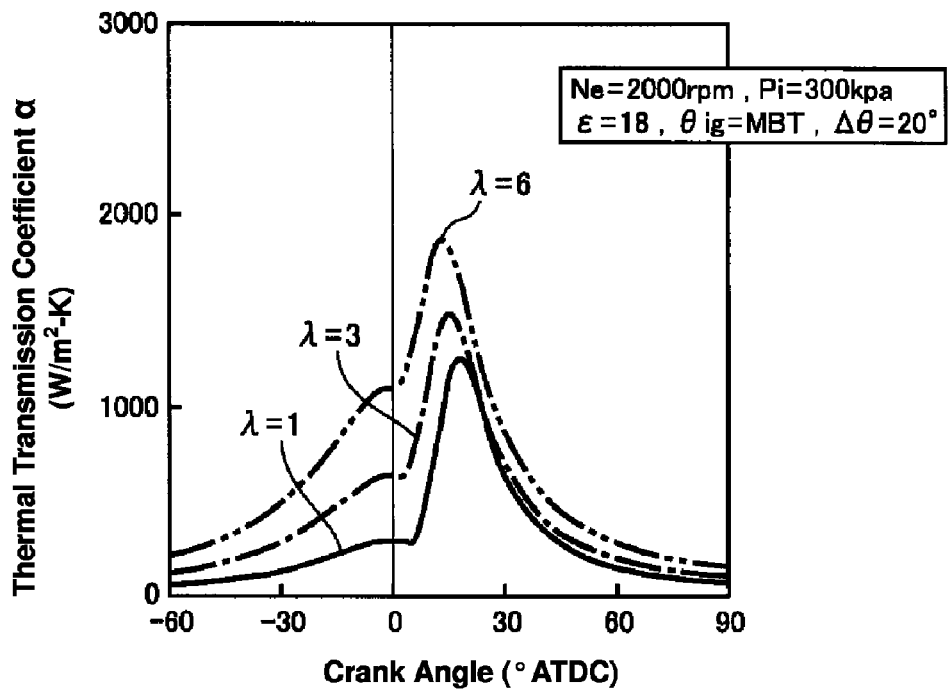
FIG. 12 is a diagram showing characteristics of a thermal transmission coefficient in case of the excess air ratio having different values.

The results of calculation with the equation (2) in case of the excess air ratio λ=1, 3, 6 are shown in FIG. 12. FIG. 12 shows the calculation results in case of the engine operation with the engine speed=2000 rpm and the indicated average effective pressure Pi=300 kPa (the representative point R in FIG. 8) in the same manner as FIGS. 9-11. The other parameters than the excess air ratio λ are the compression ratio ε=18, the ignition timing θig=MBT timing, and the combustion period Δθ=20° in crank angle.

As shown in FIG. 12, it can be understood that the thermal transmission coefficient α becomes greater in case the excess air ratio λ is greater. This is because when the excess air ratio λ becomes great and thereby the air-fuel ration becomes lean, the cylinder internal pressure P on the right side of the above-described equation (2) increases, so that the thermal transmission coefficient α increases proportionally. The cause of the thermal transmission coefficient α becoming greater in case the cylinder internal pressure P is greater may be that the thickness of a temperature boundary layer (a layer of a fluid where the temperature changes quickly, which performs as a kind of heat insulator) which is formed on a wall face of the combustion chamber becomes thin, so that the thermal transmission is promoted.

Figure 13:
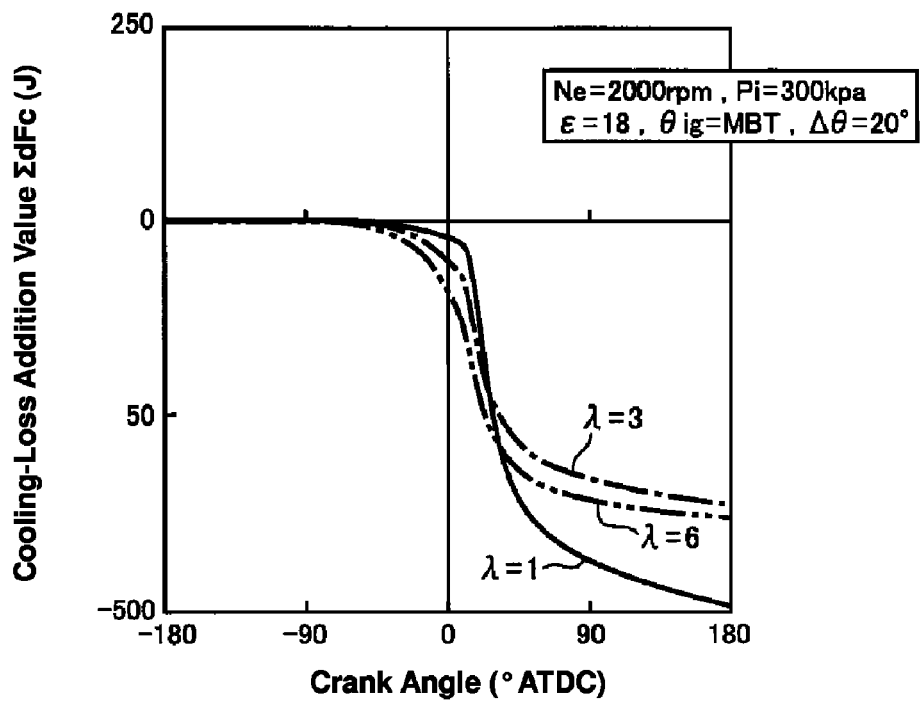
FIG. 13 is a diagram showing characteristics of a cooling-loss addition value in case of the excess air ratio having different values.

FIG. 13 is a diagram showing values of a cooling-loss addition value ΣdFc which are obtained from calculations based on the calculation results of the thermal transmission coefficient α (FIG. 12) and the above-described equation (1). FIG. 13 shows characteristics in that the greater toward the minus side the cooling-loss addition value ΣdFc is, the greater the cooling loss Fc is. According to this figure, the cooling loss Fc has the greatest value in case of the excess air ratio λ=1, and it has the smallest value in case of λ=3. The reason for the cooling loss Fc having the greatest value in case of the excess air ratio λ=1 is that the combustion with the stoichiometric air/fuel ratio is conducted and thereby the combustion temperature is high.

Meanwhile, in case the excess air ratio is changed from λ=3 to λ=6, the cooling loss Fc becomes greater. This may be because the too-much increase of the excess air ratio λ causes the excessive increase of the cylinder internal pressure and thereby the great increase of the thermal transmission coefficient α as described above, so that the cooling loss Fc is increased as well.

Accordingly, it may be said that increasing the excess air ratio λ exceeding λ=3 is not preferable because the increase of the cooling loss Fc is caused. Of course, the greater the excess air ratio λ is, the more the exhaust gas temperature decreases, so that the exhaust loss decreases (see FIG. 10), but the above-described increase of the cooling loss Fc may offset each other eventually. This the reason for the improvement of the engine thermal efficiency becoming slow in case of λ>3 as shown in FIG. 9.

In addition, it may be difficult to achieve the extremely lean air-fuel ratio of the excess air ratio λ>3 when considering the intake-air charging performance and the like. Accordingly, it may be said that the target should be set at λ=3 from both viewpoints of the utility and the thermal-efficiency improvement. Herein, with respect to the other parameters than the excess air ratio λ, the targets for these should be set, as shown in FIG. 9, as the compression ratio ε=18, the combustion period Δθ=20° in crank angle, and the ignition timing θig=MBT timing.

Herein, some practical problem which may occur when the engine operates under these combustion conditions (ε=18, λ=3, θig=MBT timing, Δθ=20°) will be considered based on FIG. 14. FIG. 14 is diagrams showing values of the cylinder internal pressure P, the pressure increase rate dP/dθ of the cylinder internal pressure P, the exhaust gas temperature Tex, and the L-W integral value $\Sigma 1/\tau$ at the representative point R of FIG. 8 in relation to the crank angle when the engine operates under the above-described combustion conditions. Herein, the exhaust gas temperature Tex is the temperature of the exhaust gas when the gas generated through the combustion of the air-fuel mixture (the mixture gas of the combusted gas, the excess air, and others) is exhausted from the exhaust port 7, which corresponds to the temperature at an E point on a T-V line shown (that is, the temperature when the exhaust valve 9 opens). The L-W integral value $\Sigma 1/\tau$ is a value which is called "Livengood-Wu integral" in the engine field, which is related to the chemical-reaction progress speed of an end gas (an unburned (nun-combusted) air-fuel mixture) and used for predicting occurrence of the knocking.

In FIG. 14, the upper limits of the cylinder internal pressure P, the pressure increase rate $dP/d\theta$, the exhaust gas temperature Tex, and the L-W integral value $\Sigma 1/\tau$ are shown by one-dotted broken lines. Specifically, in FIG. 14, the upper limit of the cylinder internal pressure P is set at a specified value in the range of 12-15 MPa, the upper limit of the pressure increase rate $dP/d\theta$ is set at a specified value within the range of 0.4-0.5 MPa/°, and the upper limit of the exhaust gas temperature Tex is set at about 1500K. The upper limits are set as described above, considering the durability of the engine and the combustion noise. Regarding the L-W integral value $\Sigma 1/\tau$, the knocking may occur when exceeding 1.0, so its upper limit is set at $\Sigma 1/\tau=1.0$.

According to FIG. 14, any one of the values of the cylinder internal pressure P, the pressure increase rate $dP/d\theta$, the exhaust gas temperature Tex (temperature at the E point), and the L-W integral value $\Sigma 1/\tau$ remains below the upper limits. Accordingly, it can be understood that the engine operation under the above-described combustion conditions ($\epsilon=18$, $\lambda=3$, $\theta ig=$MBT timing, $\Delta\theta=20°$) is appropriate.

As described above referring to FIGS. 9-14, it has been found that the engine operation under the conditions of the compression ratio $\epsilon=18$, the excess air ratio $\lambda=3$, the ignition timing $\theta ig=$MBT timing, and the combustion period $\Delta\theta=20°$ at the representative point R (the engine speed Ne=2000 rpm, the indicated average effective pressure Pi=300 kPa) in the partial engine-load area is the most preferable in order to improve both the thermal efficiency and the utility effectively.

(1-3) Verification of Engine-Load Enlargement

Figure 15:
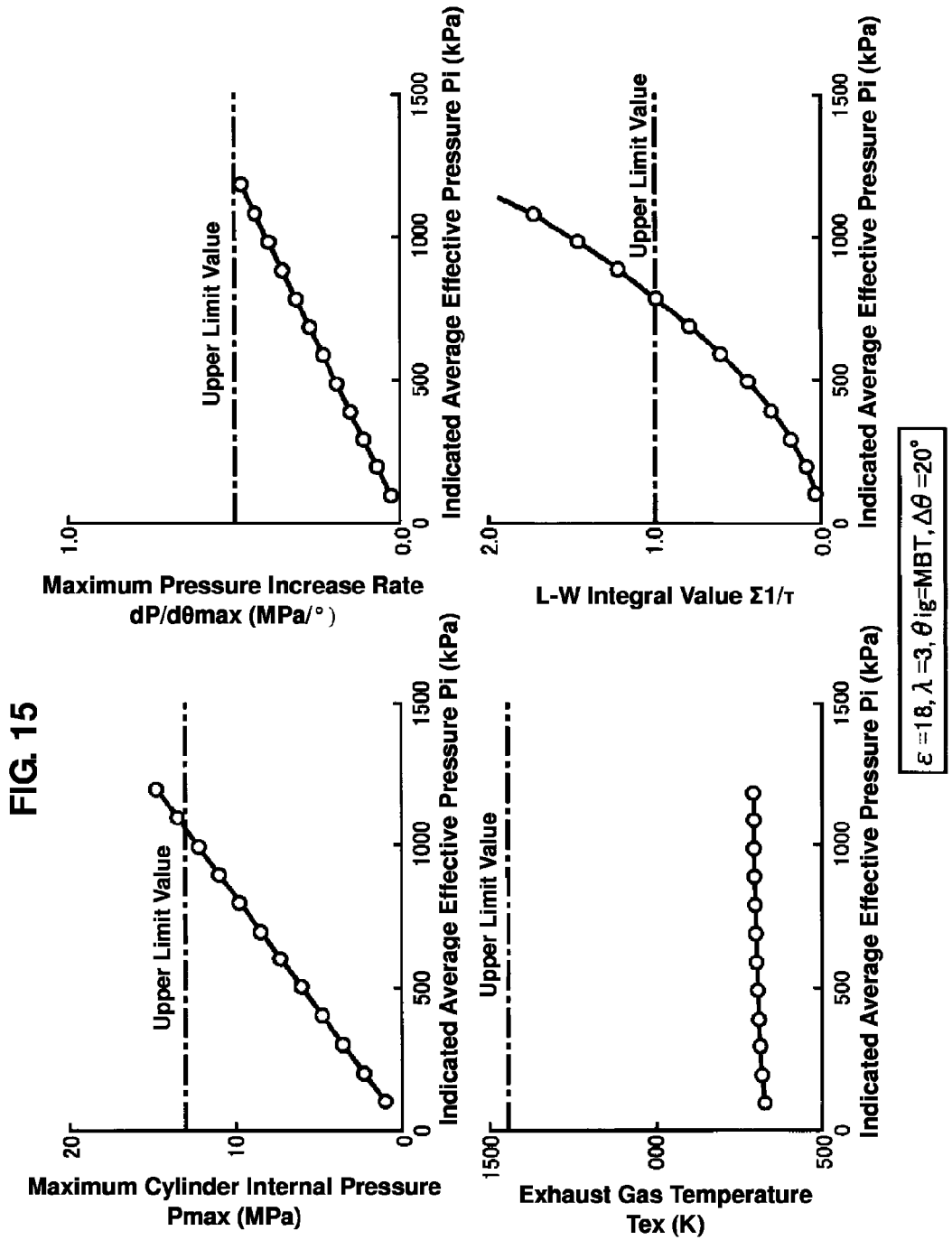
FIG. 15 is diagrams showing changes of a maximum cylinder internal pressure, a maximum pressure increase rate, the exhaust temperature, and the L-W integral value in case the engine operates up to the maximum engine-load.

Next, it will be considered whether or not the conditions of the compression ratio $\epsilon=18$, the excess air ratio $\lambda=3$, the ignition timing $\theta ig=$MBT timing, and the combustion period $\Delta\theta=20°$ in crank angle at the representative point R can be possibly continued up to the high engine-load area. FIG. 15 is diagrams showing how the maximum cylinder internal pressure Pmax, the maximum pressure increase rate $dP/d\theta$max, the exhaust gas temperature Tex, and the L-W integral value $\Sigma 1/\tau$ change according to the engine load (the indicated average effective pressure Pi of the lateral axis) when the engine operating condition changes along the line L (equal engine-speed line) of FIG. 8. Hereinafter, these Pmax, $dP/d\theta$max, Tex, and $\Sigma 1/\tau$ will be sometimes referred to as "combustion index values" as their general term. Herein, the maximum cylinder internal pressure Pmax is a maximum value of the cylinder internal pressure P shown in FIG. 14, and the maximum pressure increase rate $dP/d\theta$max is a maximum value of the pressure increase rate $dP/d\theta$. Further, in FIG. 15, the value (about 1200 kPa) of the indicated average effective pressure Pi where the rightmost plot point on each graph shows the maximum engine-load of the engine (the value on the maximum engine-load line M in FIG. 8). Unless the combustion index values (Pmax, $dP/d\theta$max, Tex, $\Sigma 1/\tau$) exceed the upper limit values in the range from the zero engine-load to the maximum engine-load, it can be determined that the engine can operate without any problems.

According to FIG. 15, the maximum pressure increase rate $dP/d\theta$max and the exhaust gas temperature Tex remain below the upper limit values in the whole area of the engine load. Thus, it can be understood that there is no problem with the engine operation. Meanwhile, the maximum cylinder internal pressure Pmax and the L-W integral value $\Sigma 1/\tau$ exceed the upper limit values in the high engine-load area, and especially the L-W integral value $\Sigma 1/\tau$, which is related to the knocking, exceeds the upper limit value greatly. This may be because considerably lots of air is necessary to be supplied into the cylinder in case the engine operation having the lean air-fuel ratio of the excess air ratio $\lambda=3$ continues up to the high engine-load area, so that the high cylinder temperature/pressure or the knocking caused by this high temperature/pressure cannot be avoided. Accordingly, it can be understood that if the combustion conditions of the partial engine-load area is continued up to the high engine-load area, there may occur problems with the maximum cylinder internal pressure Pmax and the L-W integral value $\Sigma 1/\tau$ (especially, L-W integral value), and it may be necessary to change the combustion conditions in order to avoid this matter.

Next, it will be considered how to appropriately change the combustion conditions of the engine in order to keep the maximum cylinder internal pressure Pmax and the L-W integral value $\Sigma 1/\tau$ remain below the upper limit values. As described above, the graphs of FIG. 15 show the calculation results at the combustion conditions of the compression ratio $\epsilon=18$, the excess air ratio $\lambda=3$, the ignition timing $\theta ig=$MBT timing, and the combustion period $\Delta\theta=20°$ in crank angle. Accordingly, the combustion index values (Pmax, $dP/d\theta$max, Tex, $\Sigma 1/\tau$) according to the parameter change of $\epsilon$, $\lambda$, $\theta ig$, $\Delta\theta$ are calculated, and it is determined whether or not these remain within the ranges not exceeding the respective upper limits.

Figure 16:
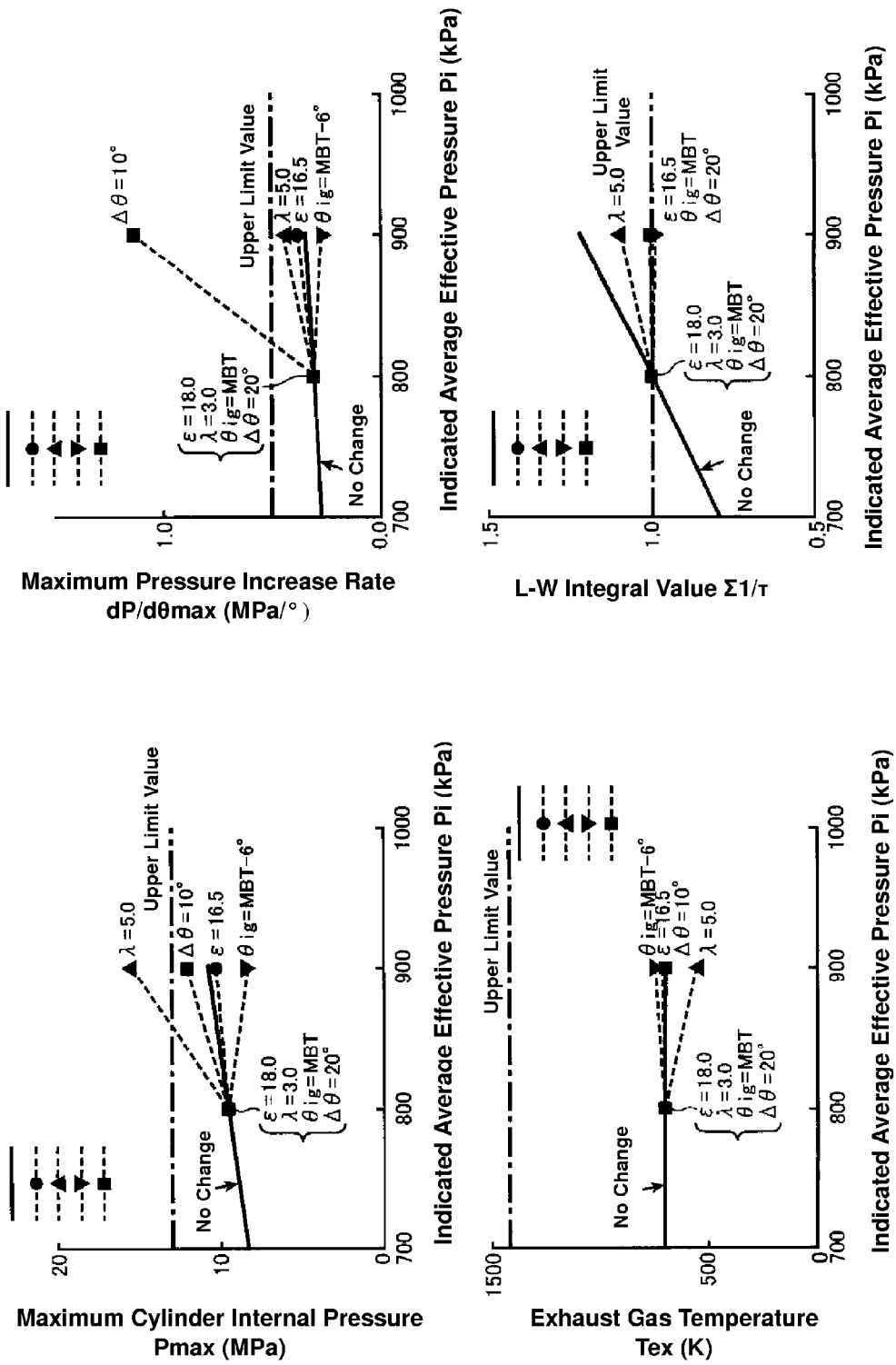
FIG. 16 is diagrams showing changes of the maximum cylinder internal pressure, the maximum pressure increase rate, the exhaust temperature, and the L-W integral value in case the various parameters of the compression ratio, the excess air ratio and others are changed in a high engine-load area.

FIG. 16 shows changes of Pmax, $dP/d\theta$max, Tex and $\Sigma 1/\tau$ in case the parameters of $\epsilon$, $\lambda$, $\theta ig$ and $\Delta\theta$ are changed at a constant rate according to the engine load on the high engine-load side from a point where the L-W integral value $\Sigma 1/\tau$ reaches the upper limit value 1.0 (i.e., a point where the indicated average effective pressure Pi is about 800 kPa). In this figure, a broken line with a mark ● shows a case in which the compression ratio $\epsilon$ is decreased, a broken line with a mark ▲ shows a case in which the excess air ratio $\lambda$ is increased to make the air-fuel ratio lean, a broken line with a mark ▼ shows a case in which the ignition timing $\theta ig$ is retarded, and a broken line with a mark ■ shows a case in which the combustion period $\Delta\theta$ is shortened. According to these lines, when the indicated average effective pressure Pi increases from about 800 kPa to 900 kPa, the parameter changes as $\epsilon=18\rightarrow16.5$ in case the compression ratio $\epsilon$ is decreased, the parameter changes as $\lambda=3\rightarrow5$ in case the excess air ratio $\lambda$ is increased, the parameter changes as $\theta ig=$MBT timing$\rightarrow$MBT timing$-16.5°$ in case the ignition timing $\theta ig$ is retarded, and the combustion period changes as $\Delta\theta=20°\rightarrow10°$ in crank angle in case the combustion period $\Delta\theta$ is shortened. Respective solid lines show the case in which the parameters of $\epsilon$, $\lambda$, $\theta ig$, or $\Delta\theta$ are remained constant without being changed in this figure.

According to FIG. 16, while the maximum cylinder internal pressure Pmax exceeds the upper limit value in case the air-fuel ratio is made lean (the excess air ratio $\lambda$ is increased), it remains below the upper limit value in the other cases. While the maximum pressure increase rate $dP/d\theta$max exceeds the upper limit value in case the combustion period Δθ is shortened, it remains below the upper limit value in the other cases. The exhaust gas temperature Tex remains below the upper limit value in case any one of ε, λ, θig and Δθ is changed. While the L-W integral value Σ1/τ exceeds the upper limit value in case the air-fuel ratio is made lean, it remains below the upper limit value in the other cases.

Figures 17, 18:
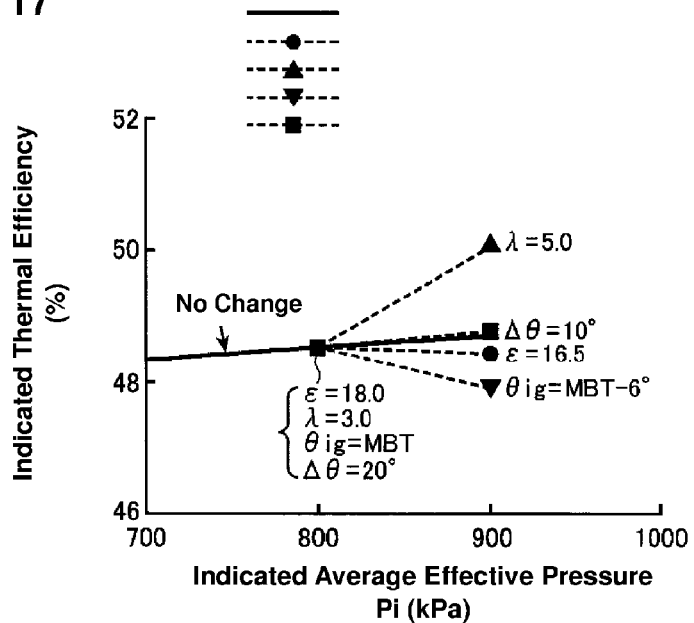
FIG. 17 is a diagram showing changes of the indicated thermal efficiency in case the various parameters are changed under the same conditions as FIG. 16.
FIG. 18 is a table showing results of FIGS. 16 and 17.

FIG. 17 is a diagram showing the change of the indicated thermal efficiency in case ε, λ, θig and Δθ are changed, like FIG. 16. According to this figure, it can be understood that the thermal efficiency of the engine has its highest value in case the air-fuel ratio is made lean (in case the excess air ratio λ is increased), and the thermal efficiency deteriorates in order of the shortening of the combustion period Δθ, the decrease of the compression ratio ε, and the retard of the ignition timing θig.

FIG. 18 is a table showing the results of FIGS. 16 and 17. As shown in this figure, the increase of the excess air ratio λ or the shortening of the combustion period Δθ are superior in the thermal efficiency as the first grade or the second grade, respectively. However, if these are chosen, there exists some problem with any one of the L-W integral value Σ1/τ, the maximum cylinder internal pressure Pmax, and the maximum pressure increase rate dP/dθmax. Therefore, it may be necessary to choose either the decrease of the compression ratio ε or the retard of the ignition timing θig, and when considering from the order of the thermal efficiency, it seems that choosing the decrease of the compression ratio ε (the third grade) is better than choosing the retard of the ignition timing θig (the fourth grade). Accordingly, it has been found that it is better to decrease the compression ratio ε in the area where the indicated average effective pressure Pi exceeds about 800 kPa.

Figure 19:
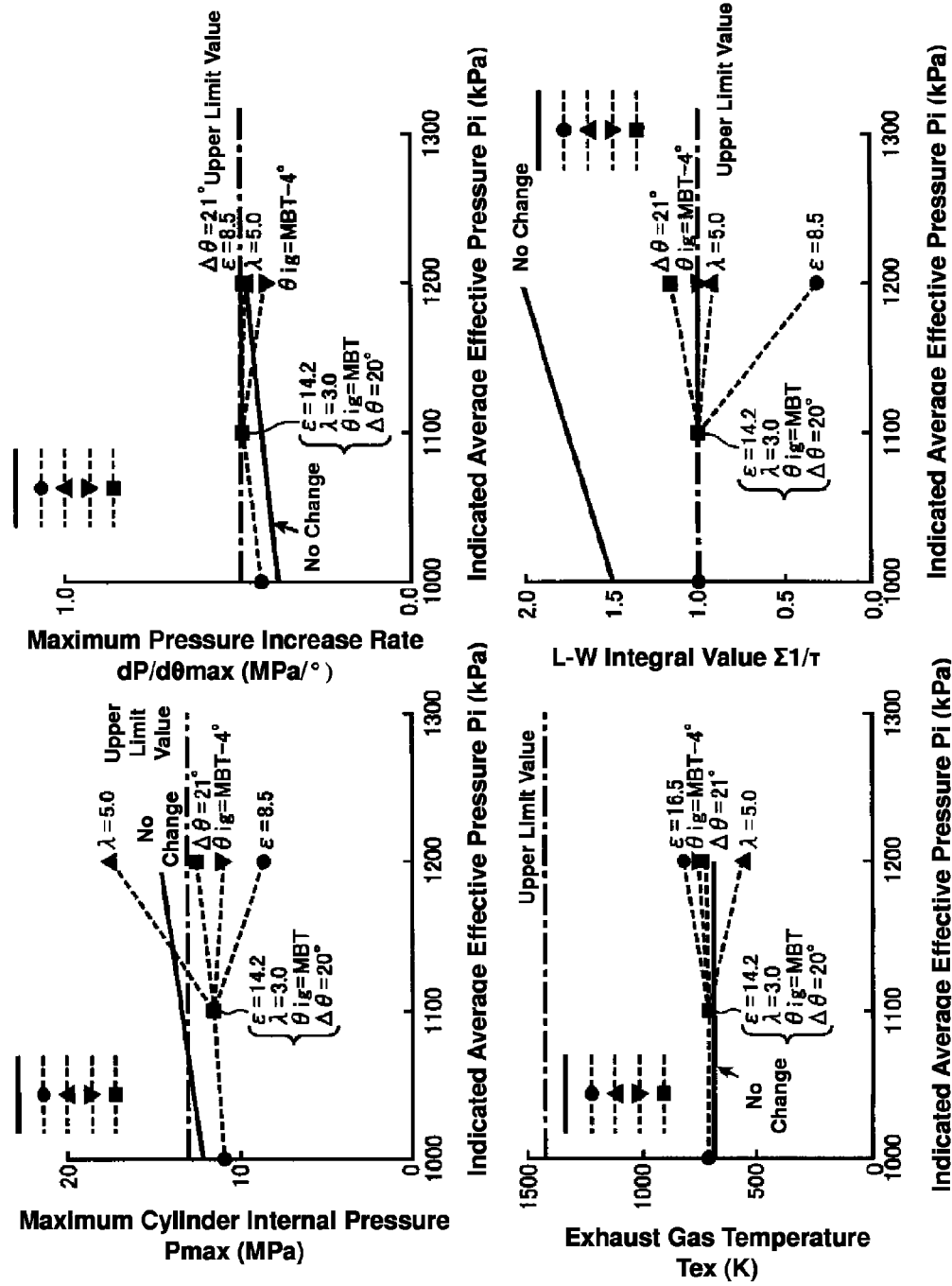
FIG. 19 is diagrams showing changes of the maximum cylinder internal pressure, the maximum pressure increase rate, the exhaust temperature, and the L-W integral value in case the various parameters of the compression ratio, the excess air ratio and others are changed in a higher engine-load area than FIG. 16.

Next, it will be considered whether or not the engine can operate in case the compression ratio ε is continued to be decreased up to the area of the high engine-load. FIG. 19 shows the respective combustion index values (Pmax, dP/dθmax, Tex, Σ1/τ) in case of the engine operation up to the high engine-load area. In FIG. 19, in the area on the low engine-load side from the indicated average effective pressure Pi is nearly equal to 1100 kPa, the compression ratio ε is decreased at the same rate as when the decrease of the compression ratio ε (the broken line with the mark ●) is chosen in FIG. 16. The compression ratio ε is 14.2 when the indicated average effective pressure Pi is nearly equal to 1100 kPa. Further, the other parameters at this point are such that λ=3.0, θig=MBT timing, and Δθ=20°, which are the same as those at the representative point R. Herein, solid lines in this figure show the respective combustion index values in case the combustion conditions at the representative point R, that is, the combustion conditions of ε=18, λ=3, θig=MBT timing, and Δθ=20° are not changed.

According to FIG. 19, the maximum pressure increase rate dP/dθmax reaches its upper limit value when the indicated average effective pressure Pi is nearly equal to 1100 kPa, and if the pressure rate dP/dθ further increases with the increase of the engine load, the combustion noise (a relatively large noise similar to the diesel knocking, for example) which is caused by the quick increase of the cylinder internal pressure may occur. That is, in the range where the indicated average effective pressure Pi exceeds about 1100 kPa, the appropriate combustion state may not be obtained even if the compression ratio ε is decreased at the same rate as FIG. 16, so that it can be understood that it is necessary to decrease the compression ratio ε more quickly or change any one of the other parameters of the excess air ratio λ, the ignition timing θig, and the combustion period Δθ. Herein, the cause of the maximum pressure increase rate dP/dθmax reaching its upper limit value when the indicated average effective pressure Pi is nearly equal to 1100 kPa is that the ignition timing of MBT to provide the maximum torque moves to the advance side due to the decrease of the compression ratio ε down to about 14.

In FIG. 19, the respective parameters of the compression ratio ε, the excess air ratio λ, the ignition timing θig, and the combustion period Δθ are changed at a constant rate according to the engine load on the high engine-load side from the indicated average effective pressure Pi being nearly equal to 1100 kPa. Specifically, a broken line with a mark ● shows a case in which the compression ratio ε is decreased quickly (more quickly than the decrease rate in case in which the indicated average effective pressure Pi is below about 1100 kPa), a broken line with a mark ▲ shows a case in which the excess air ratio λ is increased to make the air-fuel ratio lean, a broken line with a mark ▼ shows a case in which the ignition timing θig is retarded, and a broken line with a mark ■ shows a case in which the combustion period Δθ is extended. According to these lines, when the indicated average effective pressure Pi increases up to about 1200 kPa which is equivalent to the maximum engine load of the engine, the parameter changes as ε=14.2→8.5 in case the compression ratio ε is decreased, the parameter changes as λ=3→5 in case the excess air ratio λ is increased, the parameter changes as θig=MBT timing→MBT timing−4° in case the ignition timing θig is retarded, and the combustion period changes as Δθ=20°→21° in case the combustion period Δθ is extended.

According to FIG. 19, while the maximum cylinder internal pressure Pmax exceeds the upper limit value in case the air-fuel ratio is made lean (the excess air ratio λ is increased), it remains below the upper limit value in the other cases. The maximum pressure increase rate dP/dθmax remains below the upper limit value in case any one of ε, λ, θig, and Δθ is changed. The exhaust gas temperature Tex remains below the upper limit value in case any one of ε, λ, θig, and Δθ is changed. While the L-W integral value Σ1/τ exceeds the upper limit value in case the combustion period Δθ is extended, it remains below the upper limit value in the other cases.

Figures 20, 21:
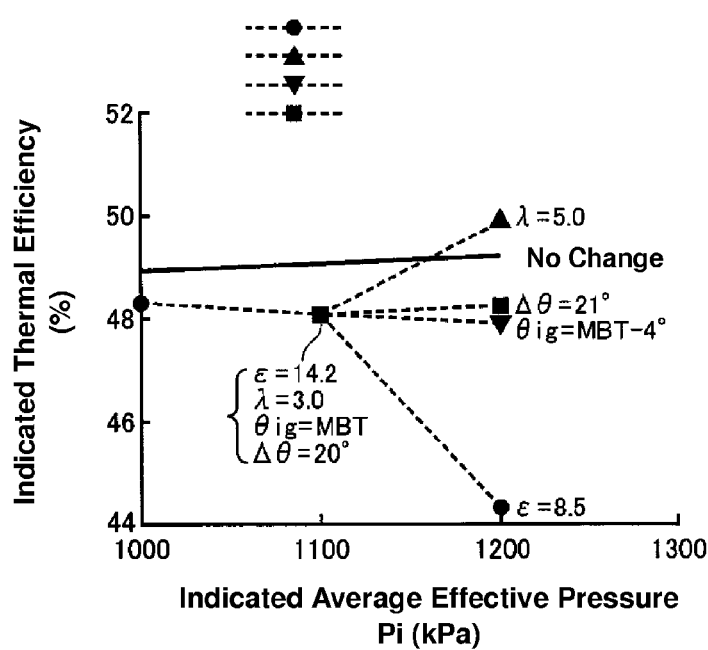
FIG. 20 is a diagram showing changes of the indicated thermal efficiency in case the various parameters are changed under the same conditions as FIG. 19.
FIG. 21 is a chart showing results of FIGS. 19 and 20.

FIG. 20 is a diagram showing the change of the indicated thermal efficiency in case ε, λ, θig and Δθ are changed, like FIG. 19. According to this figure, it can be understood that the thermal efficiency of the engine has its highest value in case the air-fuel ratio is made lean (in case the excess air ratio λ is increased), and the thermal efficiency deteriorates in order of the extension of the combustion period Δθ, the retard of the ignition timing θig, and the decrease of the compression ratio ε.

FIG. 21 is a table showing the results of FIGS. 19 and 20. As shown in this figure, the increase of the excess air ratio λ or the extension of the combustion period Δθ are superior in the thermal efficiency as the first grade or the second grade, respectively. However, if these are chosen, there exists some problem with any one of the maximum cylinder internal pressure Pmax and the L-W integral value Σ1/τ. Therefore, it may be necessary to choose either the decrease of the compression ratio ε or the retard of the ignition timing θig, and when considering from the order of the thermal efficiency, it seems that choosing the retard of the ignition timing θig (the third grade) is better than choosing the decrease of the compression ratio ε (the fourth grade). Accordingly, it has been found that it is better to retard the ignition timing θig in the area where the indicated average effective pressure Pi exceeds about 1100 kPa.

(1-4) Conclusions

The following conclusions can be obtained from the above-described verifications based on FIGS. 7-21.

(a) The engine operation under the combustion conditions of the compression ratio $\epsilon=18$, the excess air ratio $\lambda=3$, the ignition timing $\theta ig$=MBT timing, and the combustion period $\Delta\theta=20°$ is the most effective in the partial engine-load area from the both viewpoints of the thermal efficiency and the utility, judging from the calculation results the thermal efficiency at the representative point R (FIG. 8) of the engine speed Ne=2000 rpm, the indicated average effective pressure Pi=300 kPa).

(b) However, if the above-described combustion conditions ($\epsilon=18$, $\lambda=3$, $\theta ig$=MBT timing, $\Delta\theta=20°$) continues up to the high engine-load area, there occurs some problems, such as the knocking or the increase of the combustion noise. It is necessary to change any one of the parameters of the compression ratio $\epsilon$, the excess air ratio $\lambda$, the ignition timing $\theta ig$, and the combustion period $\Delta\theta$ in the high engine-load area in order to prevent occurrence of the problems.

(c) While some manners for changing the parameters of $\epsilon$, $\lambda$, $\theta ig$, and $\Delta\theta$ may be considered, it is preferable from viewpoints of restraining the loss of the thermal efficiency, preventing the knocking and others, that the compression ratio $\epsilon$ be decreased gradually according to the engine load in the range where the indicated average effective pressure Pi is nearly equal to 800 kPa or greater and smaller than 1100 kPa, and the ignition timing $\theta ig$ be retarded gradually according to the engine load in the range where the indicated average effective pressure Pi is nearly equal to 1100 kPa or greater and smaller than 1200 kPa.

Figure 22:
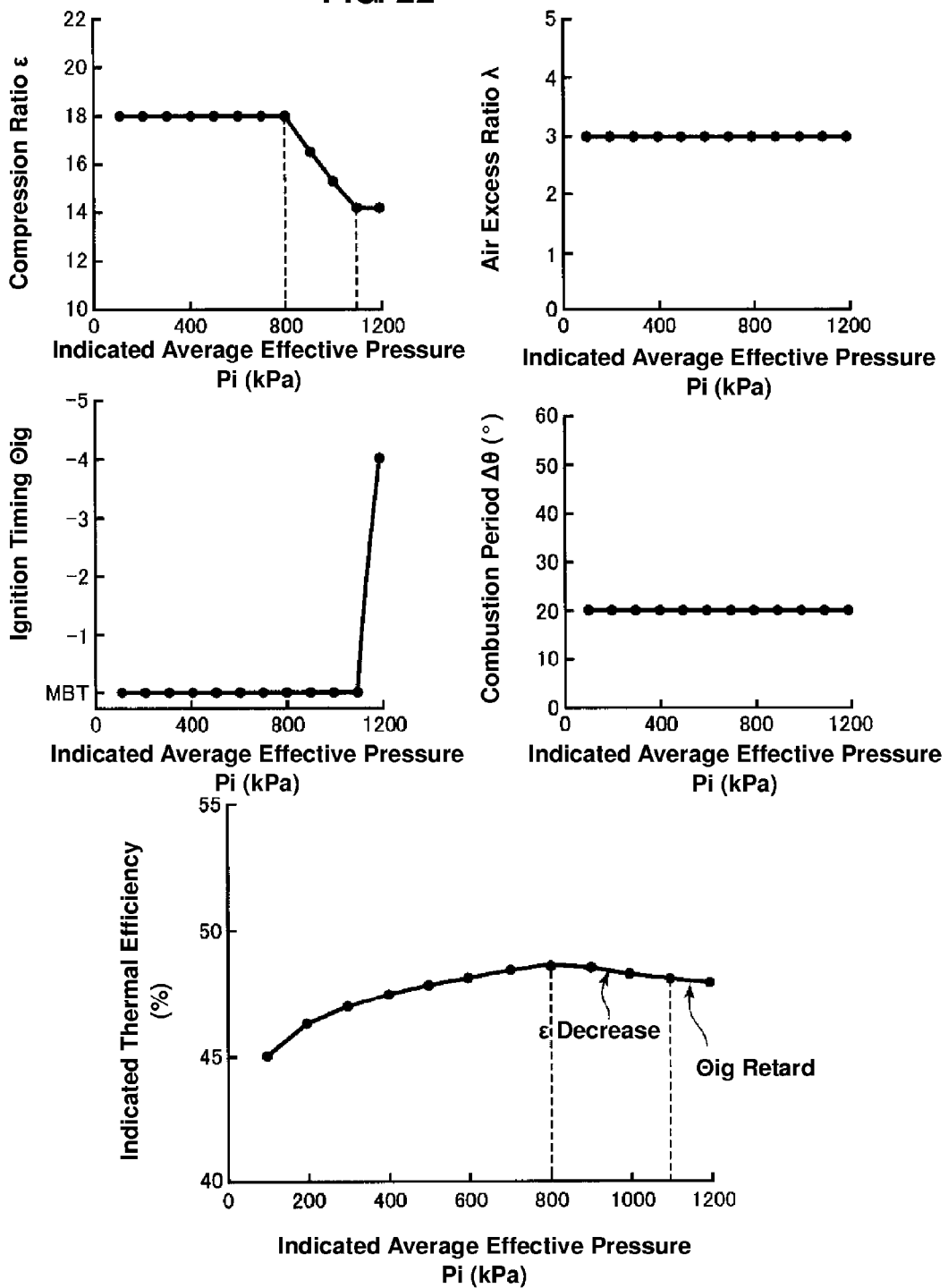
FIG. 22 is diagrams showing a preferred control example obtained from the results of FIGS. 16-21 and changes of the indicated thermal efficiency based on the control example.

(d) FIG. 22 shows the values of the parameters of $\epsilon$, $\lambda$, $\theta ig$, and $\Delta\theta$ in case of executing the controls of the above-described (c) and the change of the indicated thermal efficiency based on these controls. The engine operation under the conditions shown in this figure can prevent the knocking occurrence and the combustion-noise increase effectively, maintaining the properly high thermal efficiency.

(1-5) Correspondence to Embodiment

As can be understood from the above-described (1-4), the controls (FIG. 5) of the parameters of $\epsilon$, $\lambda$, $\theta ig$ and $\Delta\theta$ and others in the above-described A. Embodiment are obtained from the results of FIG. 22. In correspondence relationships between them, the indicted average effective pressure Pi=800 kPa in FIG. 22, which is the point where the compression ratio $\epsilon$ starts to be decreased, corresponds to the first engine-load X1 of FIG. 5, and the indicted average effective pressure Pi=1100 kPa, which is the point where the ignition timing $\theta ig$ starts to be retarded, corresponds to the second engine-load X2 of FIG. 5. The engine operation with the control characteristics shown in FIG. 5 can achieve both the improvement of the thermal efficiency by making the air-fuel ratio lean and the prevention of the detonation (abnormal combustion) in the high engine-load area.

That is, according to the above-described embodiment, the thermal efficiency can be improved greatly and thereby the fuel economy can be improved effectively by maintaining the excess air ratio $\lambda$ at the lean state of $\lambda\equiv3$ ($\lambda$ is nearly equal to 3). However, in case the air-fuel lean state is continued up to the high engine-load, it is necessary for the amount of air intake to be increased greatly according to the increase of the engine load, so that the knocking may occur easily due to the increase of the cylinder internal temperature/pressure (see the graph of the L-W integral value $\Sigma 1/\tau$ in FIG. 16). In the above-described embodiment, the compression ratio $\epsilon$ is decreased in case the engine load is greater than the first engine-load X1, so that any occurrence of the knocking in the high engine-load area can be effectively prevented. Herein, in case the engine load is greater than the second engine-load X2 which is above the first engine-load X1, the large combustion noise might occur due to the quick increase of the cylinder internal pressure (the increase of $dP/d\theta$) (see the graph of $dP/d\theta$max in FIG. 19). According to the present embodiment, however, the above-described occurrence of the combustion noise can be also prevented by retarding the ignition timing $\theta ig$ in case the engine load is greater than the second engine-load X2. Thus, according to the present embodiment, the occurrence of the knocking or the increase of the combustion noise in the high engine-load area can be prevented effectively, increasing the thermal efficiency by making the air-fuel ratio greatly lean.

(2) Temperature Control of Catalyst (2-1) Method for Increase of Exhaust Gas Temperature It was found from the description above that the thermal efficiency can be increased properly by executing the combustion control of the engine shown in FIG. 5 (or FIG. 22) from the description. However, the exhaust gas temperature Tex decreases more than the normal engine in case of executing this high thermal-efficiency control as described in the above (3) of A. Embodiment. Especially, in the above-described specified area Y including the low engine-speed and low engine-load area, the engine load is relatively low and the combustion conditions having the high thermal efficiency, such as $\epsilon=18$, $\lambda\equiv3$, $\theta ig$=MBT timing, and $\Delta\theta=20°$, so that the exhaust gas temperature Tex tends to become lower. Accordingly, it is highly likely that the catalyst temperature Tc decreases below the active temperature (about 600 K) when the engine operates in the specified area Y. Thus, some countermeasure for avoiding this situation may be desired.

Of course, since the exhaust gas temperature Tex at the representative point R (FIG. 8) is about 600 K, as shown by the graph on the left and bottom in FIG. 15, even under the combustion conditions ($\epsilon=18$, $\lambda\equiv3$, $\theta ig$=MBT timing, and $\Delta\theta=20°$) in the specified area Y, it may be considered that the catalyst temperature Tc does not decrease greatly below the active temperature (about 600 K) as long as the engine idling state (that is, the state where the amount of exhaust gas supply to the catalyst decreases) does not last long or the fuel cut during the deceleration does not occur often, for example. To the contrary, in case the above-described states (lasting of the engine idling state or the fuel cut) happen often, there happens the possibility that the catalyst temperature Tc decreases below the active temperature. Accordingly, the inventors of the present invention thought of intentionally increasing the exhaust gas temperature Tex by increasing the exhaust loss temporarily for keeping the catalyst temperature Tc above the active temperature when the engine operating condition is in the specified area Y and the catalyst temperature Tc becomes relatively low.

Figure 23:
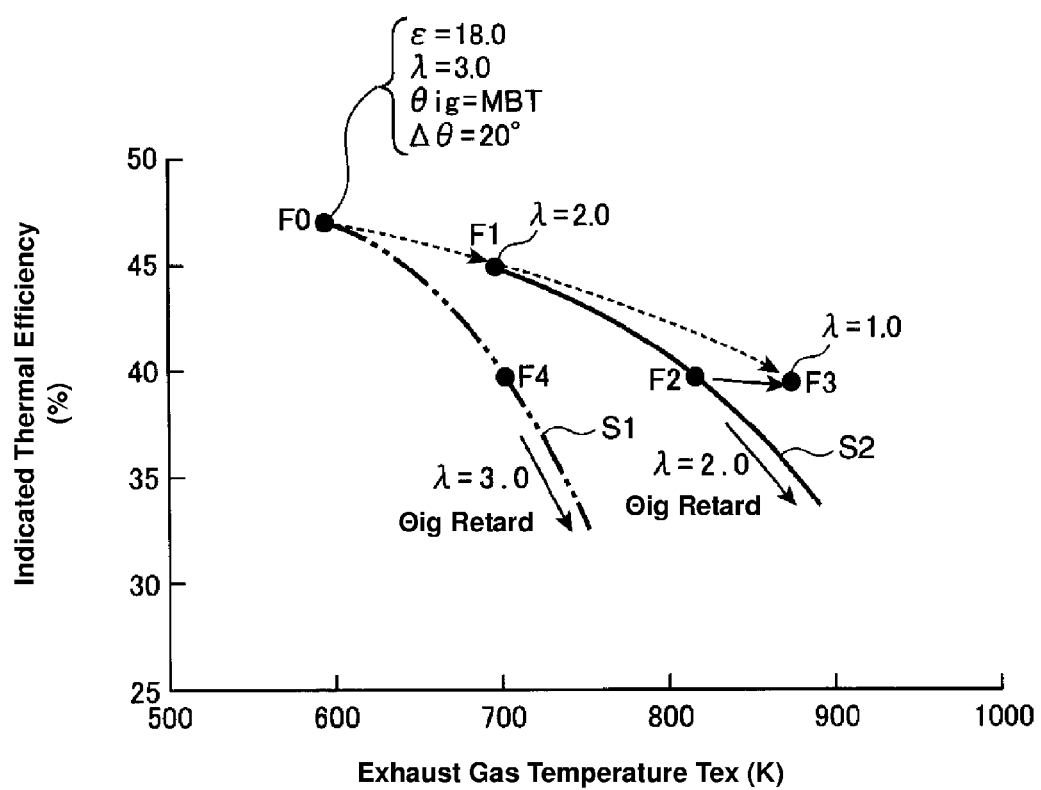
FIG. 23 is a diagram showing changes of an exhaust gas temperature and the thermal efficiency in case combustion conditions are changed.

FIG. 23 is a diagram showing how the exhaust gas temperature Tex and the thermal efficiency change in case the combustion conditions are changed. Herein, this figure shows a point F0 as a value which is obtained in case the air-fuel mixture is combusted under the ideal combustion conditions of the compression ratio $\epsilon=18$, the excess air ratio $\lambda=3$, the ignition timing $\theta ig$=MBT timing, and the combustion period $\Delta\theta=20°$ (the combustion conditions of the partial engine-load area of FIG. 5 or 22) at the representative point R shown in FIG. 8 (the engine speed Ne=2000 rpm, the indicated average effective pressure Pi=300 kPa). The other points F1, F2, F3 and F4 show respective values in case either one or both of the excess air ratio $\lambda$ and the ignition timing $\theta ig$ are changed (the other parameters have fixed values of the compression ratio $\epsilon=18$ and the combustion period $\Delta\theta=20°$). Curve lines S1, S2 which pass through points F0→F4, F1→F2 show the changes in case the excess air ratio $\lambda$ is fixed at $\lambda=3$, $\lambda=2$ and the ignition timing $\theta ig$ is gradually retarded. Herein, it is shown that the ignition timing θig which is located on the right and lower side of the curve lines S1, S2 has a greater retarded value.

As apparently from FIG. 23, the exhaust gas temperature Tex can be increased by making the air-fuel ratio rich by decreasing the excess air ratio λ or retarding the ignition timing θig. That is, making the air-fuel ratio rich decreases the amount of air having the low temperature which is exhausted together with the combusted (burned) gas, so that the exhaust gas temperature Tex becomes higher. Further, retarding the ignition timing θig from the MBT timing (the timing to provide the maximum torque) increases the exhaust loss, so that the exhaust gas temperature Tex becomes higher as well. Herein, the thermal efficiency may be deteriorated by making the air-fuel ratio rich or retarding the ignition timing θig.

(2-2) Correspondence to Embodiment

The present inventors investigated based on the results of FIG. 23 how to increase the exhaust gas temperature Tex properly without deteriorating the thermal efficiency by changing the air-fuel ratio (excess air ratio λ) and the ignition timing θig. Consequently, they have found the combustion control shown in FIG. 6.

Specifically, according to the present embodiment, three kinds of controls shown in the steps S6, S8 and S9 of FIG. 6 are executed according to how much the catalyst temperature Tc is lower than the first temperate T1. The increase effect of the exhaust gas temperature by the three-kind controls will be described referring to FIG. 23 showing the cases where the excess air ratio λ and the ignition timing θig are changed at the representative point R (Ne=2000 rpm, Pi=300 kPa).

First, the control of the step S9 which is executed when the catalyst temperature Tc is lower than the lowest third temperature T3 will be described. In this step S9, as described above, the control that the ignition timing θig is maintained at the MBT timing and the excess air ratio λ is decreased to λ=1 (stoichiometric air-fuel ratio) is executed. Thereby, in case the control of the step S9 is executed at the representative point R, for example, the combustion state moves to the point F3 on FIG. 23, so that the exhaust gas temperature Tex increases greatly from about 600 K to nearly 900 K, compared with the original condition (the point F0).

Next, in the step S8 where the control is executed when the catalyst temperature Tc is the third temperature T3 or higher and lower than the second temperature T2 (T3≦Tc<T2), the control that the excess air ratio λ is changed to λ=2 and the ignition timing θig is retarded from the MBT timing is executed (corresponding to the line S2 of FIG. 23). The amount (value) of retard of the ignition timing θig can be set properly, but it is preferable that the retard amount be restrained up to the point F2 so that the thermal efficiency does not decrease than that in case of λ=1 (the point F3). That is, this point F2 shows the case where the excess air ratio λ is set as λ=2 and the ignition timing θig is so retarded that the thermal efficiency can be almost the same level as that at the point F3. The exhaust gas temperature Tex can be increased from about 600 K to 800 K, compared with the original condition (the point F0), by changing the combustion conditions up to the point F2. Herein, the retard amount of the ignition timing θig at the point F2 is about 15°.

Further, in the step S6 where the control is executed when the catalyst temperature Tc is the second temperature T2 or higher and lower than the first temperature T1 (T2≦Tc<T1), the control that the excess air ratio λ is changed from λ=3 to λ=2 and the ignition timing θig is maintained at the MBT timing is executed. Thereby, the combustion state moves to the point F1 on FIG. 23, so that the exhaust gas temperature Tex can be increased from about 600 K to 700 K, compared with the original condition (the point F0). Herein, this degree of increase of the exhaust gas temperature Tex can be achieved only by retarding the ignition timing θig with the excess air ratio λ=3 like the line S1 of FIG. 23 (see the point F4 on the line S1, for example). However, it can be understood that in this case the degree of deterioration of the thermal efficiency is relatively large, compared with the degree of increase of the exhaust gas temperature obtained. For this reason, according to the present embodiment, the above-described control that the ignition timing θig is retarded with the excess air ratio λ=3 like the above-described line S1 is not executed, but the control that the excess air ratio λ is changed from 3 to 2 with the ignition timing θig maintained at the MBT timing is executed as shown at the point F1.

As described above referring to FIG. 23, according to the controls of the steps S6, S8 and S9 in the above-described embodiment (the flowchart of FIG. 6), the exhaust gas temperature Tex can be increased, and the degree of increase of the temperature is the largest in case of the control of the step S9 of the excess air ratio λ=3, the ignition timing θig=MBT timing, and its becomes smaller in order of the control of the step S8 of λ=2, the retarded ignition timing θig and the control of the step S6 of λ=2, θig=MBT timing.

C. Summary of Embodiment and Effect

Lastly, the summary of the embodiment and its effect will be described. In the embodiment, the catalyst-temperature-related combustion control is executed in case the engine operating condition is in the specified area Y in which the engine load is relatively low and the engine operates under the combustion conditions having the properly high thermal efficiency (ε=18, λ=3, θig=MBT timing, Δθ=20°) and the temperature Tc of the catalyst in the catalyst converter 24 is lower than the predetermined specified temperature T1. This catalyst-temperature-related combustion control includes the controls that the ignition timing θig is maintained (set) at the MBT timing or retarded from the MBT timing and the excess air ratio λ is decreased from λ=3 to the smaller ratio (λ=2 or λ=1) (see the steps S6, S8, S9 of FIG. 6). According to these controls, the catalyst temperature Tc can be prevented simply and effectively from decreasing excessively, maintaining the combustion conditions to provide the properly high thermal efficiency.

That is, according to the embodiment, since the controls of decreasing the excess air ratio λ (making the air-fuel mixture rich) and the like are executed at need in the specified area Y where the engine load is low and the thermal efficiency is high and thereby the exhaust-gas temperature Tex is so low that the catalyst temperature Tc tends to become lower than the catalyst's active temperature, the exhaust-gas temperature Tex can be increased easily only by changing the combustion conditions, so that the catalyst temperature Tc can be effectively prevented from decreasing excessively. Further, since the control kind of the catalyst-temperature-related combustion control having plural controls of the excess air ratio λ and the ignition timing θig is selected depending on the magnitude of the catalyst temperature Tc, the degree (amount) of the above-described increase of the exhaust-gas temperature Tex can be adjusted properly according to the increase requirement of the catalyst temperature. Consequently, the activation of the catalyst can be properly ensured.

For example, in case the catalyst temperature Tc is the second temperature T2 or higher and lower than the first temperature T1 (NO at the step S5), the excess air ratio λ is decreased from λ=3 to λ=2, maintaining the ignition timing θig at the MBT timing is executed (step S6). Thereby, in case it is determined that the catalyst temperature Tc is slightly lower than the first temperature T1 and therefore the catalyst temperature Tc may be maintained at the active temperature without increasing the exhaust gas temperature Tex so much, the exhaust gas temperature Tex can be increased by the proper degree according to the situation (see the point F1 of FIG. 23). Accordingly, the activity of the catalyst can be ensured.

Meanwhile, in case the catalyst temperature Tc is the third temperature T3 or higher and lower than the second temperature T2 (NO at the step S7), the excess air ratio λ is decreased (3→2) and the ignition timing θig is retarded from the MBT timing (step S8). Thereby, the exhaust gas temperature Tex can be further increased by changing the ignition timing θig (see the point F2 of FIG. 23), so that the catalyst temperature can be maintained at the active temperature surely.

Further, in case the catalyst temperature Tc is lower than the third temperature T3 which is lower than the second temperature T2 (YES at the step S7), the ignition timing θig is returned to the MBT timing and the excess air ratio λ is promptly decreased to λ=1 (step S9). Thereby, when it is determined that the decrease of the catalyst temperature Tc considerably progresses and therefore the quick increase of the catalyst temperature Tc is required, the exhaust gas temperature Tex is increased greatly (see the point F3 of FIG. 23), so that the catalyst temperature can be maintained at the active temperature surely.

Thus, according to the embodiment, in case the engine operating condition is in the specified area Y and the catalyst temperature Tc is lower than the first temperature T1, the three-kind control which comprises the control of decreasing the excess air ratio λ to λ=2, maintaining the ignition timing θig at the MBT timing (step S6), the control of decreasing the excess air ratio λ to λ=2 and retarding the ignition timing θig from the MBT timing (step S8), and the control of decreasing the excess air ratio λ to λ=1, maintaining the ignition timing θig at the MBT timing (step S9) is executed in order of the higher temperature of the catalyst. Thereby, the increase degrees of the exhaust gas temperature Tex can be set precisely according to the increase requirement of the catalyst temperature, so that the catalyst temperature can be maintained at the active temperature properly.

Moreover, according to the control of the embodiment, since the excess air ratio λ is set at λ=2 or greater, or λ=1, not within the range of λ=1 through 2, even in case the catalyst temperature Tc is in any one of the above-described temperature areas, the emission of NOx can be restrained properly by controlling the excess air ratio λ, without arranging the expensive NOx catalyst in the exhaust passage 19, for example.

That is, since NOx is purified by the catalyst converter 24 including the three-way catalyst at the properly high efficiency in the rich air-fuel ratio area having the excess air ratio λ=1 or smaller, the NOx emission exhausted through the exhaust passage 19 to the outside can be restrained properly. Meanwhile, since the combustion temperature of the air-fuel mixture becomes pretty low in the lean air-fuel ratio area having the excess air ratio λ=2 or greater, the amount of NOx emission generated through the combustion decreases greatly, so that the NOx emission exhausted to the outside can be properly restrained even if the purifying function of the three-way catalyst does not perform very much. Thus, setting the excess air ratio λ at λ=1 or smaller, or λ=2 or greater enables the proper decrease of the NOx emission without using an expensive NOx catalyst containing lots of precious metals.

Meanwhile, since the more amount of NOx is generated and the purifying function of the three-way catalyst deteriorates in the range of the range of λ=1 through 2, compared with the case of λ=2 or greater, the NOx emission exhausted to the outside may not be restrained properly unless the NOx catalyst is arranged in the exhaust passage 19, for example. Accordingly, in order to decrease the NOx emission without any particular device such as the NOx catalyst, it is effective to set the excess air ratio λ at λ=2 or greater, or λ=1 or smaller in any combustion controls, like the above-described embodiment.

Further, since the combustion period of the combustion period Δθ is maintained at 20° regardless of the setting the ignition timing θig at the MBT timing or retarding according to the embodiment, the decrease of the thermal efficiency in case of retarding the ignition timing θig can be restrained as much as possible.

Moreover, the exhaust passage 19 from the catalyst converter 24 to the engine body 1 has the double-pipe structure according to the present embodiment, the temperature decrease of the exhaust gas flowing down to the catalyst through the exhaust passage 19 can be restrained effectively. Accordingly, it may be unnecessary that any frequent control to retard the ignition timing θig or decrease the excess air ratio λ in order to increase the exhaust gas temperature Tex is executed, so that the thermal efficiency can be maintained at a properly high level.

Herein, according to the above-described embodiment, the excess air ratio λ is maintained at the lean value of λ≡3 in all areas of the engine load at the normal state excluding the case where the engine operating condition is in the specified area Y and the catalyst temperature Tc is lower than the first temperature T1, so the high-performance supercharger 25 which comprises the large-sized compressor 27 and the electric motor 29 is used to supply lots of air to the engine in the high engine-load area. However, an applicable supercharger should not be limited to this type of supercharger 25. For example, plural superchargers which have different supercharging characteristics may be applied, which are used selectively according to the engine operating condition.

Further, while the excess air ratio λ is maintained as λ≡3 in all areas of the engine load at the normal state according to the embodiment, in case the enough supercharging by the supercharger 25 is not ensured due to costs or any other aspects, the excess air ratio λ may be set at about λ=2 in all areas or a partial area of the engine load. As shown by the second graph from the left (the graph at Δθ=20°) in FIG. 9, even if the excess air ratio λ is decreased from 3 to about 2, the indicated thermal efficiency decrease only about 2% in case of the compression ratio 18. Therefore, the thermal efficiency can be improved sufficiently, compared with the conventional manner.

Herein, in case the excess air ratio λ at the normal state is set as λ=2, the control of the step S6 in the flowchart of FIG. 6 may be the same as the combustion control at the normal state, so that the step S6 may be omitted here. In this particular case, the two-kind control comprising the control of the step S8 (λ=2, retarded θig) and the control of the step S9 (λ=1, θig=MBT timing) may be applied.

Moreover, even in case the three-kind control (step S6, S8, S9) is applied like the embodiment, the magnitudes of the excess air ratio λ should not be limited to the example shown in FIG. 6. That is, in case the excess air ratio λ at the normal state (λ≡3 according to the embodiment) is referred to as a "first value" and the rich excess air ratio λ of the steps S6, S8 of FIG. 6 (λ=2 according to the embodiment) is referred to as a "second value," any specific value of λ is applicable as long as the excess air ratio λ is controlled so that the relationship of ["the first value">"the second value"≧2] can be satisfied.

While the combustion period Δθ is maintained at 20° in all areas of the engine load in the above-described embodiment, it can be considered that it may be difficult to keep the combustion period Δθ within the specified crank-angle range in the actual control. Further, it can be considered that even if the combustion period Δθ changes about ±5° relative to 20°, the thermal efficiency may not change so greatly, judging from the distributions (FIG. 9) of the thermal efficiency calculated at Δθ=10°, 20°, 35°, 60°. Therefore, the combustion of the actual engine should be properly controlled so that the combustion period Δθ can remain within the 20±5°.

Further, while any specific description about the kind of fuel to be injected from the injector 10 has not been provided, gasoline is applicable or any fuel containing hydrogen is preferably applicable. In case of using gasoline, for example, it can be considered that in the above-described specified area Y having the considerably high compression ratio ε=18, the air-fuel mixture ignites by itself near at the compression top dead center, so that the combustion caused by the spark may not be executed properly. Therefore, hydrogen or gasoline containing hydrogen may be preferably considered as the fuel to provide the stable spark-ignition combustion surely even under the high compression ratio. Or, in case the conventional gasoline is used, the maximum value of the compression ratio ε may be decreased from 18 by a certain degree (about 15, for example).

Further, while the above-described embodiment has the part of the exhaust passage 19 from the catalyst converter 24 to the engine body 1 which is formed in the double-pipe structure so that the exhaust gas temperature can be prevented from decreasing greatly during the gas reaches the catalyst, the catalyst converter 24 may be provided at the most upstream portion of the exhaust passage 19 (close to the engine body) if there is no problem with arrangement of devices. Thereby, the high-temperature exhaust gas exhausted from the engine body 1 flows down into the catalyst converter 24, so that the temperature decrease of the exhaust gas can be prevented effectively without using the double-pipe structure of the exhaust passage 19.

Further, while the catalyst temperature is directly detected by the catalyst-temperature sensor 64 provided at the catalyst converter 24 in the above-described embodiment, the temperature of the exhaust gas flowing upstream or downstream of the catalyst converter 24 may be detected, and the catalyst temperature may be obtained through calculation or the like based on this detected exhaust gas temperature. Or, the catalyst temperature may be obtained only through calculation based on the engine operating condition (engine speed/load), an outside temperature, and so on.

What is claimed is:

1. A control method of a spark-ignition engine which comprises a spark plug to supply a spark to ignite an air-fuel mixture within a combustion chamber and a catalyst for purifying exhaust gas which is provided in an exhaust passage, the control method comprising:
   executing a normal combustion control in case an engine operating condition is in a specified operating area including a low engine-speed and low engine-load area and a temperature of the catalyst is a specified temperature or higher, the normal combustion control including setting an excess air ratio λ at a first specified ratio which is between two and three and setting an ignition timing at a timing of MBT to provide the maximum torque; and
   executing a catalyst-temperature-related combustion control in case the engine operating condition is in said specified operating area and the temperature of the catalyst is lower than said specified temperature, the catalyst-temperature-related combustion control having at least a first control which is executed when the catalyst temperature is within a first temperature range and a second control which is executed when the catalyst temperature is lower than the first temperature range, the first control including setting the excess air ratio λ at two or greater and retarding the ignition timing from the timing of MBT, the second control including setting the excess air ratio λ to one or smaller and maintaining the ignition timing at the timing of MBT.

2. The control method of a spark-ignition engine of claim 1, further comprising, when the catalyst temperature decreases beyond said specified temperature in said specified operating area, decreasing the excess air ratio λ from said first specified ratio to a second specified ratio which is two or greater, and smaller than said first specified ratio while maintaining the ignition timing at the timing of MBT.

3. The control method of a spark-ignition engine of claim 2, further comprising, when the catalyst temperature decreases into said first temperature range, setting the ignition timing retarded from the timing of MBT while setting the excess air ratio λ at said second specified ratio.

4. The control method of a spark-ignition engine of claim 3, further comprising, when the catalyst temperature decreases from said first temperature range, decreasing the excess air ratio λ from said second specified ratio to one or smaller, without setting said excess ratio first specified ratio and setting the ignition timing at the timing of MBT.

5. The control method of a spark-ignition engine of claim 4, wherein a combustion period of the air-fuel mixture is maintained within a range of 20±5° in crank angle in said specified operating area regardless of the ignition timing which is set at the timing of MBT or retarded from the timing of MBT.

6. The control method of a spark-ignition engine of claim 2, further comprising, when the catalyst temperature decreases from said first temperature range, decreasing the excess air ratio λ from said second specified ratio to one or smaller without setting said excess ratio first specified ratio and setting the ignition timing at the timing of MBT.

7. The control method of a spark-ignition engine of claim 6, wherein a combustion period of the air-fuel mixture is maintained within a range of 20±5° in crank angle in said specified operating area regardless of the ignition timing which is set at the timing of MBT or retarded from the timing of MBT.

8. The control method of a spark-ignition engine of claim 1, wherein a combustion period of the air-fuel mixture is maintained within a range of 20±5° in crank angle in said specified operating area regardless of the ignition timing which is set at the timing of MBT or retarded from the timing of MBT.

9. A spark-ignition engine system which comprises a spark plug to supply a spark to ignite an air-fuel mixture within a combustion chamber and a catalyst for purifying exhaust gas which is provided in an exhaust passage, the engine system comprising:
   an ECU configured to perform the process of:
      controlling an air-fuel ratio of the air-fuel mixture;
      controlling an ignition timing of the spark plug;
      detecting an engine operating condition; and
      measuring temperature of the catalyst,
   wherein the ECU is further configured to perform the process of controlling the air-fuel ratio and the ignition timing so that a normal combustion control is executed in case the engine operating condition detected is in a specified operating area including a low engine-speed and low engine-load area and the temperature of the catalyst which is a specified temperature or higher, the normal combustion control including setting an excess air ratio λ at a first specified ratio which is between two and three and setting the ignition timing at a timing of MBT to provide the maximum torque, and wherein the ECU is further configured to perform the process of controlling the air-fuel ratio and the ignition timing so that a catalyst-temperature-related combustion control is executed in case the engine operating condition is in said specified operating area and the temperature of the catalyst is lower than said specified temperature, the catalyst-temperature-related combustion control having at least a first control which is executed when the catalyst temperature is within a first temperature range and a second control which is executed when the catalyst temperature is lower than the first temperature range, the first control including setting the excess air ratio λ at two or greater and retarding the ignition timing from the timing of MBT, the second control including setting the excess air ratio λ to one or smaller and maintaining the ignition timing at the timing of MBT.

10. The spark-ignition engine system of claim 9, wherein said catalyst-temperature-related combustion control further includes, when the catalyst temperature decreases beyond said specified temperature in said specified operating area, a control of decreasing the excess air ratio λ from said first specified ratio to a second specified ratio which is two or greater, and smaller than said first specified ratio while maintaining the ignition timing at the timing of MBT.

11. The spark-ignition engine system of claim 10, wherein said catalyst-temperature-related combustion control further includes, when the catalyst temperature decreases into said first temperature range, a control of setting the ignition timing retarded from the timing of MBT while setting the excess air ratio λ at said second specified ratio.

12. The spark-ignition engine system of claim 11, wherein said catalyst-temperature-related combustion control further includes, when the catalyst temperature decreases from said first temperature range, a control of decreasing the excess air ratio λ from said second specified ratio to one or smaller without setting said excess ratio first specified ratio and setting the ignition timing at the timing of MBT.

13. The spark-ignition engine system of claim 12, wherein a combustion period of the air-fuel mixture is maintained within a range of 20±5° in crank angle in said specified operating area regardless of the ignition timing which is set at the timing of MBT or retarded from the timing of MBT.

14. The spark-ignition engine system of claim 10, wherein said catalyst-temperature-related combustion control further includes, when the catalyst temperature decreases from said first temperature range, a control of decreasing the excess air ratio λ from said second specified ratio to one or smaller without setting said excess ratio first specified ratio and setting the ignition timing at the timing of MBT.

15. The spark-ignition engine system of claim 14, wherein a combustion period of the air-fuel mixture is maintained within a range of 20±5° in crank angle in said specified operating area regardless of the ignition timing which is set at the timing of MBT or retarded from the timing of MBT.

16. The spark-ignition engine system of claim 9, wherein a combustion period of the air-fuel mixture is maintained within a range of 20±5° in crank angle in said specified operating area regardless of the ignition timing which is set at the timing of MBT or retarded from the timing of MBT.

17. The spark-ignition engine system of claim 9, wherein at least part of an exhaust passage from said catalyst to an engine body has a double-pipe structure.

* * * * *